(12) United States Patent
Aldred et al.

(10) Patent No.: US 12,715,748 B2
(45) Date of Patent: Aug. 25, 2026

(54) APPARATUS FOR THE PREPARATION AND DISPENSING OF POST-MIX CARBONATED DRINKS

(71) Applicant: SODAFLO LIMITED, Cambridgeshire (GB)

(72) Inventors: Ian Alexander Aldred, Cambridgeshire (GB); Alistair John Scott, Cambridgeshire (GB); Allen John Pearson, Cambridgeshire (GB); Daniel O'Connell, Cambridgeshire (GB)

(73) Assignee: SODAFLO LIMITED, Cambridgeshire (GB)

( * ) Notice: Subject to any disclaimer, the term of this patent is extended or adjusted under 35 U.S.C. 154(b) by 341 days.

(21) Appl. No.: 18/276,233

(22) PCT Filed: Feb. 7, 2022

(86) PCT No.: PCT/GB2022/050312
§ 371 (c)(1),
(2) Date: Aug. 7, 2023

(87) PCT Pub. No.: WO2022/171986
PCT Pub. Date: Aug. 18, 2022

(65) Prior Publication Data

US 2024/0109762 A1 Apr. 4, 2024

(30) Foreign Application Priority Data

Feb. 12, 2021 (GB) ..................................... 2102005
Dec. 23, 2021 (GB) ..................................... 2118950

(51) Int. Cl.
*B67D 1/00* (2006.01)
*A23L 2/54* (2006.01)
(Continued)

(52) U.S. Cl.
CPC ............. *B67D 1/0039* (2013.01); *A23L 2/54* (2013.01); *B01F 23/2361* (2022.01);
(Continued)

(58) Field of Classification Search
CPC ............. B67D 1/10; B67D 2001/0091; B67D 1/0079; B67D 1/1202; B67D 2001/0812;
(Continued)

(56) References Cited

U.S. PATENT DOCUMENTS 1,258,964 A 3/1918 Voorsanger
1,925,466 A 9/1933 Simpson
(Continued)

FOREIGN PATENT DOCUMENTS

CN 203461293 U 3/2014
CN 109383923 A 2/2019
(Continued)

OTHER PUBLICATIONS

PCT Application No. PCT/GB2022/050312, International Search Report and Written Opinion mailed Aug. 11, 2022, 19 pp.

*Primary Examiner* — Paul R Durand
*Assistant Examiner* — Michael C Patterson
(74) *Attorney, Agent, or Firm* — BKRIP LLC

(57) ABSTRACT

Apparatus (10) for the preparation of aerated drinks, comprising: an aerator stage (20) comprising: a removable aerator bottle (30) defining a chamber (32) for receiving a liquid to be aerated; an aerator bottle interface (40) operative to engage the removable aerator bottle (30) and seal the chamber (32) thereof; a gas inlet line (60) operative to fluidly connect a gas source (50) to the aerator bottle interface (40); and a gas supply mechanism (70) for controlling supply of gas from the gas source (50) to the aerator bottle interface (40) via the gas inlet line (60); an aerated
(Continued)

liquid dispenser stage (100) comprising: an aerated liquid dispenser outlet (110); a liquid outlet line (120) operative to fluidly connect the aerator bottle interface (40) to the aerated liquid dispenser outlet (110) to allow aerated liquid to flow from the chamber (32) of the removable aerator bottle (30) to the aerated liquid dispenser outlet (110); and a liquid flow controller (130) for controlling discharge of aerated liquid from the removable aerator bottle (30) to the aerated liquid dispenser outlet (110) via the liquid outlet line (120); and a flavouring liquid dispenser stage (200) comprising: a flavouring liquid dispenser (210) comprising a flavouring liquid dispenser outlet (212), wherein the flavouring liquid dispenser (210) comprises a flavouring liquid dispenser mechanism (214) that is activated by gas pressure; and a gas outlet line (220) including a gas outlet (222) provided in the aerator bottle interface (40); wherein the apparatus further comprises a pressure control stage (240) comprising: a gas reservoir (250) connected to the gas outlet line (220) and operative to store pressurised gas received from the removable aerator bottle (30) during an initial aeration step; and an exhaust mechanism (242) operative to vent gas from the removable aerator bottle (30) during a subsequent venting step in order to lower the level of gas pressure in the removable aerator bottle (30) prior to discharge of the aerated liquid from the removable aerator bottle (30) via the aerated liquid dispenser stage (100).

3 Claims, 21 Drawing Sheets

(51) Int. Cl.

| | |
|---|---|
| ***B01F 23/2361*** | (2022.01) |
| ***B67D 1/04*** | (2006.01) |
| ***B67D 1/08*** | (2006.01) |
| ***B67D 1/10*** | (2006.01) |
| ***B67D 1/12*** | (2006.01) |

(52) U.S. Cl.

CPC ......... *B67D 1/0074* (2013.01); *B67D 1/0078* (2013.01); *B67D 1/0079* (2013.01); *B67D 1/0406* (2013.01); *B67D 1/045* (2013.01); *B67D 1/0462* (2013.01); *B67D 1/0888* (2013.01); *B67D 1/10* (2013.01); *B67D 1/1202* (2013.01); *B67D 1/1252* (2013.01); *B67D 1/0001* (2013.01); *B67D 1/0057* (2013.01); *B67D 1/0071* (2013.01); *B67D 1/0075* (2013.01); *B67D 2001/0091* (2013.01); *B67D 2001/0812* (2013.01); *B67D 2001/0814* (2013.01); *B67D 2210/0012* (2013.01)

(58) Field of Classification Search

CPC .......... B67D 2001/0814; B67D 1/0406; B67D 1/045; B67D 1/0462; B67D 1/0001; B67D 1/0057; B67D 1/0071; B67D 1/0075; B67D 2210/0012; B67D 1/0039; B67D 1/0074; B67D 1/0078; B67D 1/0888; B67D 1/1252; B67D 7/741; B67D 1/04; A23L 2/54; B01F 23/2361; F04B 43/02; F04B 43/0063

USPC .................. 222/399, 397, 394, 129.1, 424.5; 99/323.1, 323.2, 275, 290–291, 295, 99/299–315

See application file for complete search history.

(56) References Cited

U.S. PATENT DOCUMENTS

| | | | | |
|---|---|---|---|---|
| 2,643,866 | A | 6/1953 | Kollsman | |
| 2,805,846 | A | 9/1957 | Dewan | |
| 3,578,295 | A | 5/1971 | Hudson | |
| 3,628,444 | A | 12/1971 | Mazza | |
| 3,813,010 | A * | 5/1974 | Hassell | B01F 23/2363 222/129.1 |
| 3,884,391 | A * | 5/1975 | Pauliukonis | B67D 3/00 222/129.4 |
| 4,028,441 | A * | 6/1977 | Richards | G05D 7/0193 62/307 |
| 4,120,424 | A * | 10/1978 | Zygiel | F04B 43/113 222/207 |
| 4,251,473 | A | 2/1981 | Gilbey | |
| 4,481,986 | A | 11/1984 | Meyers | |
| 4,482,509 | A * | 11/1984 | Iannelli | B01F 35/71805 261/DIG. 7 |
| 4,496,080 | A | 1/1985 | Farber | |
| 4,518,541 | A | 5/1985 | Harris | |
| 4,520,950 | A * | 6/1985 | Jeans | B67D 1/0021 137/614.04 |
| 4,664,292 | A | 5/1987 | Jeans | |
| 4,735,348 | A | 4/1988 | Santoiemmo | |
| 4,947,739 | A | 8/1990 | Owen | |
| 5,118,010 | A * | 6/1992 | Jeans | B67D 1/008 261/DIG. 7 |
| 5,154,319 | A * | 10/1992 | Deininger | B67D 1/102 222/105 |
| 5,499,741 | A * | 3/1996 | Scott | B67D 1/129 222/207 |
| 5,782,617 | A * | 7/1998 | Habla | F04B 43/06 417/403 |
| 5,870,944 | A * | 2/1999 | Vander Zalm | B01F 23/2361 261/DIG. 7 |
| 5,954,233 | A | 9/1999 | Kawashima | |
| 6,669,053 | B1 * | 12/2003 | Garson | B67D 1/1281 222/61 |
| 8,888,073 | B2 | 11/2014 | Leung | |
| 9,302,229 | B2 | 4/2016 | Leung | |
| 10,201,785 | B2 * | 2/2019 | Cohen | B01F 33/40 |
| 10,485,374 | B2 | 11/2019 | Lo Faro | |
| 11,655,806 | B2 * | 5/2023 | Beavis | G05D 11/133 73/861.47 |
| 12,213,617 | B2 * | 2/2025 | Anthony | B01F 23/2361 |
| 2003/0075813 | A1 * | 4/2003 | Kiefer | B01F 23/2361 261/64.3 |
| 2006/0021919 | A1 * | 2/2006 | Olson | B01F 35/213 210/85 |
| 2008/0149669 | A1 * | 6/2008 | Nicholson | B67D 1/10 222/207 |
| 2008/0245314 | A1 | 10/2008 | Brodowski | |
| 2008/0283550 | A1 * | 11/2008 | Nighy | F04B 43/0736 222/207 |
| 2010/0155419 | A1 * | 6/2010 | Nishino | B67D 1/0802 222/113 |
| 2011/0020508 | A1 * | 1/2011 | Santoiemmo | A23L 2/56 426/232 |
| 2011/0177201 | A1 | 7/2011 | Sonnenrein | |
| 2011/0181417 | A1 * | 7/2011 | Haskayne | B67D 1/0021 340/572.1 |
| 2013/0062366 | A1 * | 3/2013 | Tansey | B67D 1/0809 222/101 |
| 2013/0089645 | A1 | 4/2013 | Leung | |
| 2014/0079856 | A1 | 3/2014 | Hatherell | |
| 2014/0356491 | A1 * | 12/2014 | Giardino | B01F 35/2113 426/231 |
| 2015/0125586 | A1 * | 5/2015 | Ergican | A47J 31/46 99/295 |
| 2015/0129614 | A1 * | 5/2015 | Green | B67D 1/1286 99/323.2 |
| 2017/0240401 | A1 * | 8/2017 | Pellaud | B67D 1/0078 |
| 2018/0029774 | A1 | 2/2018 | Stever | |
| 2018/0237217 | A1 | 8/2018 | Stefanoni | |
| 2018/0303275 | A1 * | 10/2018 | Ergican | A23L 2/395 |

(56) References Cited

U.S. PATENT DOCUMENTS

| | | | | |
|---|---|---|---|---|
| 2019/0275478 | A1* | 9/2019 | Jersey | B01F 35/2115 |
| 2019/0291062 | A1* | 9/2019 | Wood | A47J 31/4492 |
| 2019/0292036 | A1 | 9/2019 | Rice | |
| 2019/0389714 | A1* | 12/2019 | Sonnichsen | B67D 1/0804 |
| 2020/0122100 | A1 | 4/2020 | Tumey | |

FOREIGN PATENT DOCUMENTS

| | | | |
|---|---|---|---|
| EP | 0000845 | A2 | 2/1979 |
| JP | 2019535496 | | 12/2019 |
| WO | 2018089460 | A1 | 5/2018 |
| WO | 2019183466 | A1 | 9/2019 |

* cited by examiner

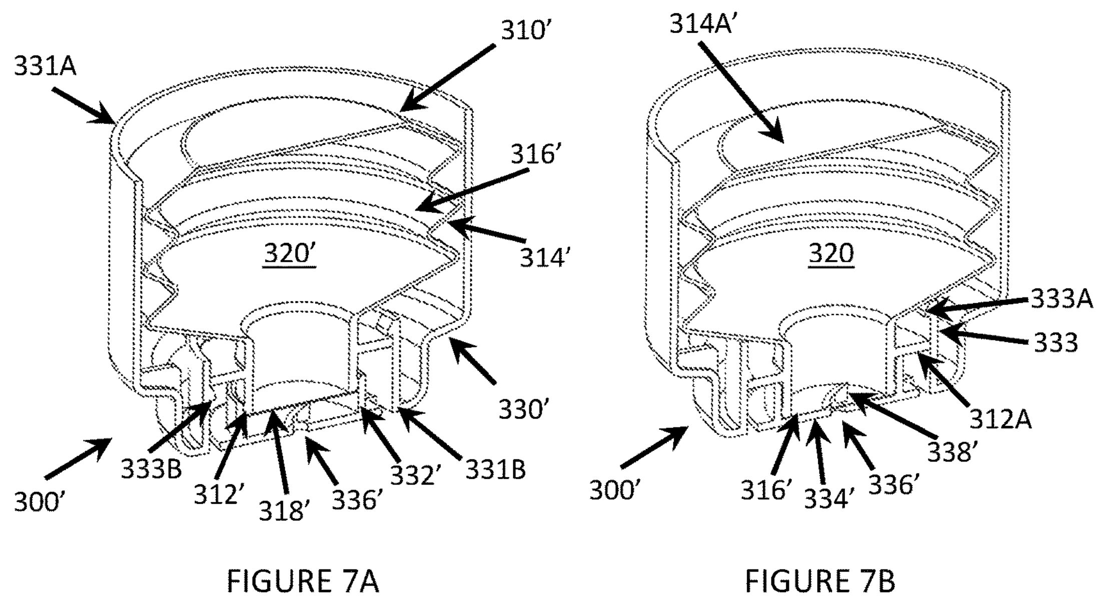
FIGURE 7A
FIGURE 7B
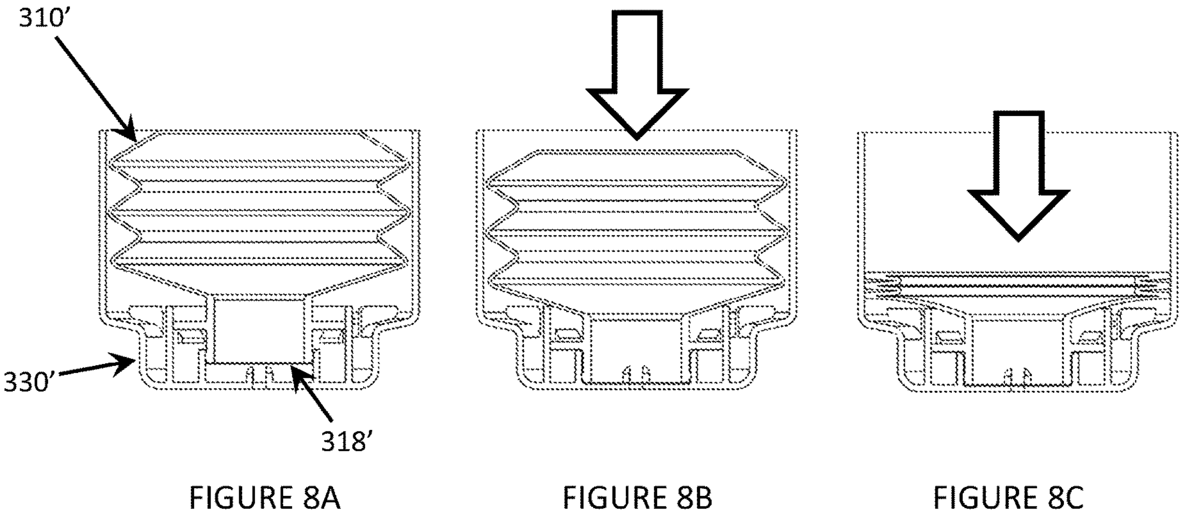
FIGURE 8A
FIGURE 8B
FIGURE 8C

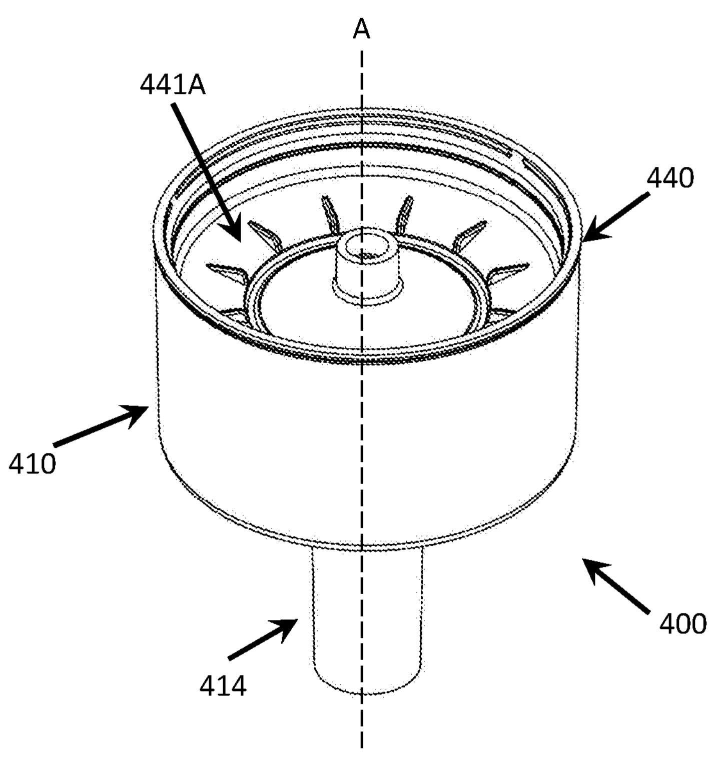
FIGURE 9
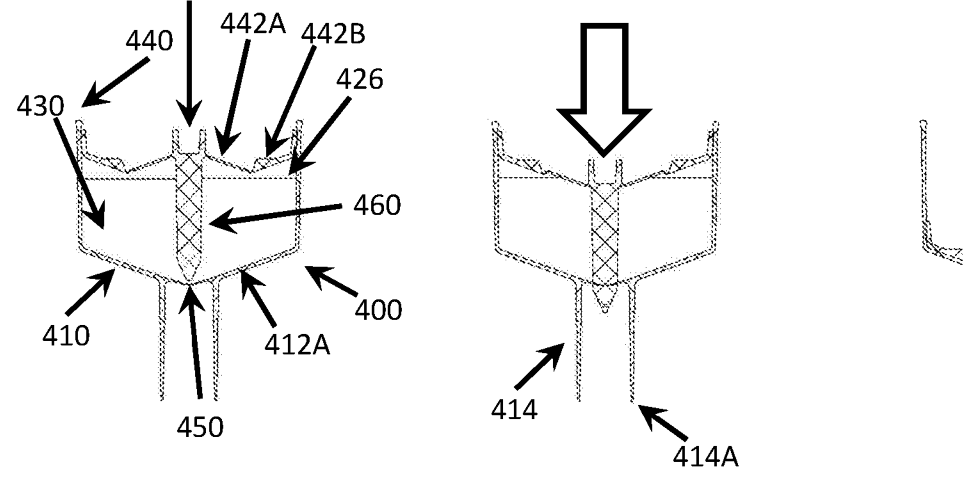
FIGURE 10A
FIGURE 10B
FIGURE 10C 440
414
410

440
414
410

440
414
410

470
464

414

414

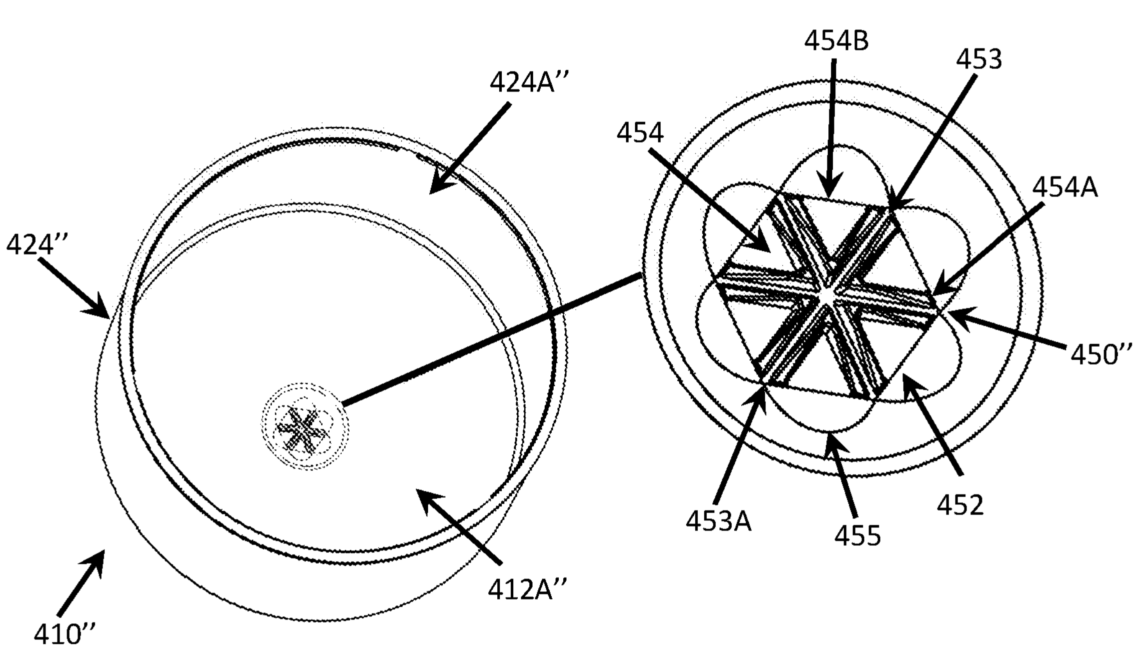
FIGURE 17
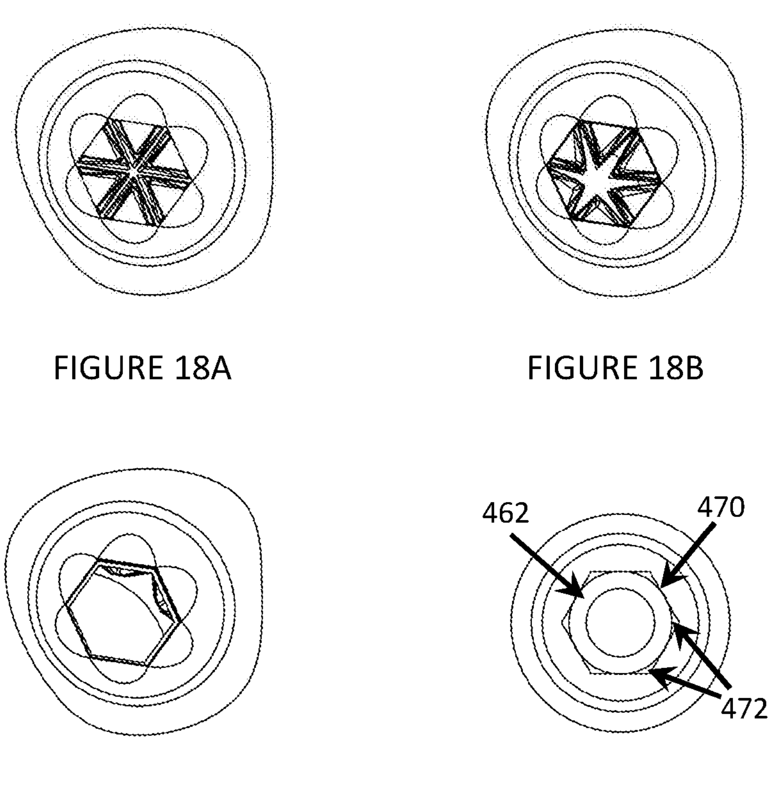
FIGURE 18A
FIGURE 18B
FIGURE 18C
FIGURE 18D

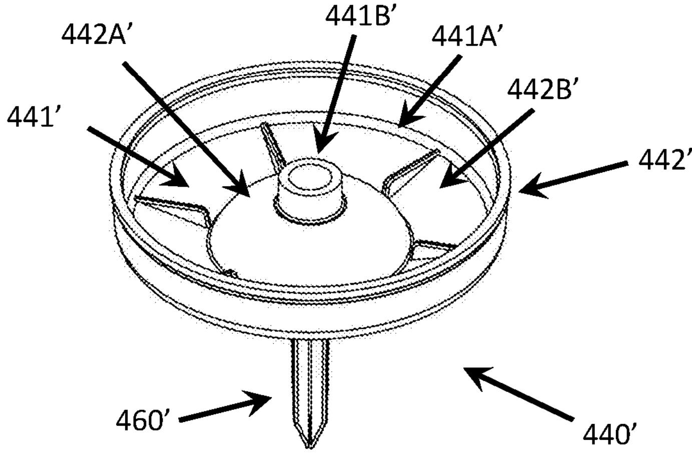
FIGURE 19
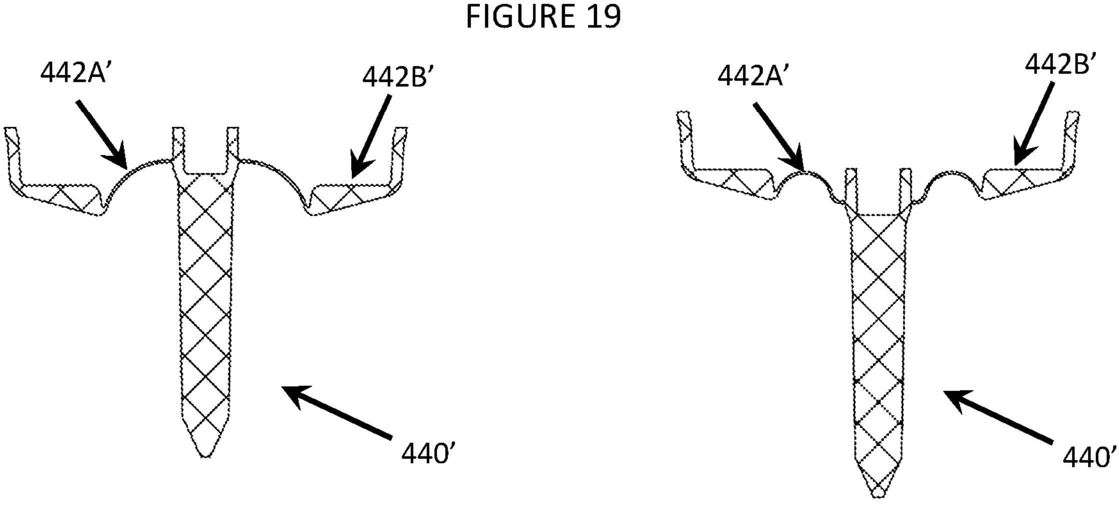
FIGURE 20A
FIGURE 20B

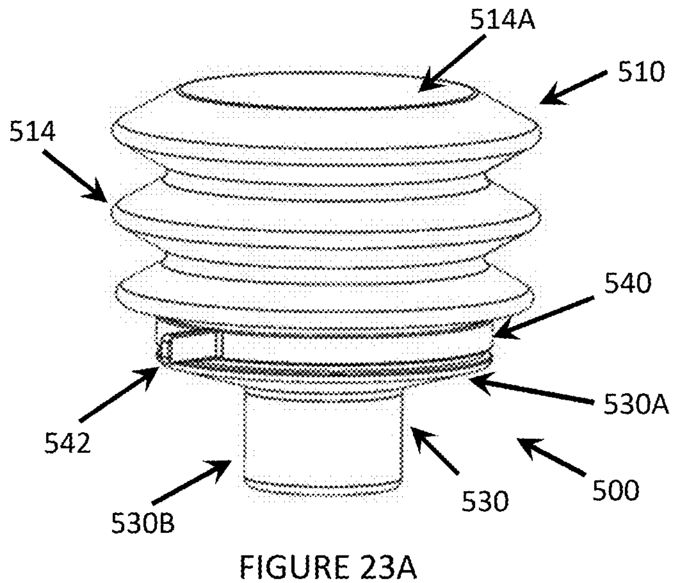
FIGURE 23A
510
516
514
520
540
531
514A
550A
550B
530
532
538
512
534
518
536
FIGURE 23B
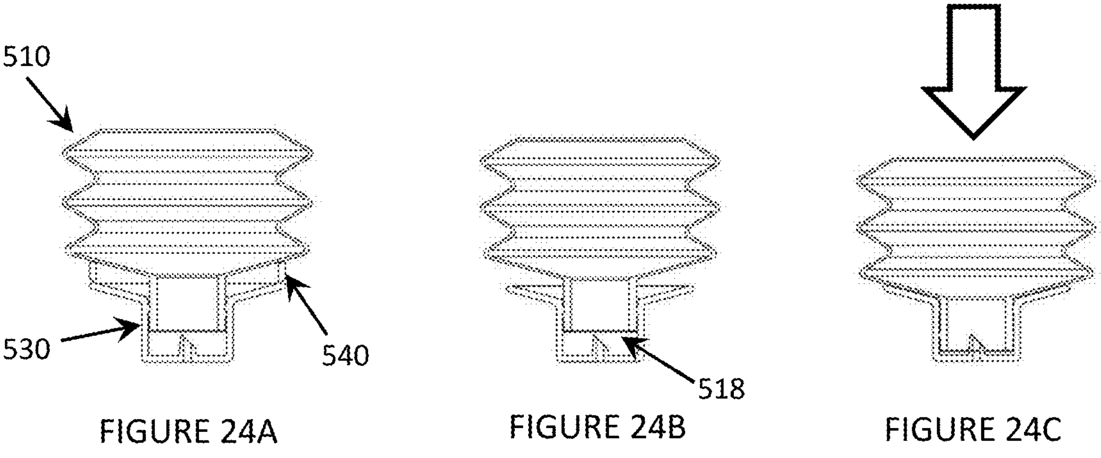
FIGURE 24A
FIGURE 24B
FIGURE 24C 250'
254'
STEP 4
$CO_2$
600
610
Closed
Open
230'
242'
280
270
212'

APPARATUS FOR THE PREPARATION AND DISPENSING OF POST-MIX CARBONATED DRINKS

TECHNICAL FIELD

The present invention relates to apparatus for the preparation of aerated drinks, particularly but not exclusively to apparatus for preparing carbonated drinks, and to a corresponding method.

BACKGROUND

Domestic carbonator devices are well known in the art and are based around the provision of an aerator stage comprising: a removable aerator bottle defining a chamber for receiving a liquid to be carbonated; an aerator bottle interface operative to engage the removable aerator bottle and seal the chamber thereof; a gas inlet line operative to fluidly connect a gas cylinder containing pressurised $CO_2$ gas to the aerator bottle interface, the gas inlet line typically terminating in a gas inlet nozzle supported by the aerator bottle interface and configured to extend into the chamber of the aerator bottle when the aerator bottle engages the aerator bottle interface; and a gas supply mechanism (including either a manually actuated mechanical valve or an electrically controlled solenoid valve) for controlling supply of pressurised $CO_2$ gas from the gas cylinder to the aerator bottle via the gas inlet line.

In use, a liquid (typically water) is added to the chamber of the removable aerator bottle and the removable aerator bottle is connected in a sealed manner to the aerator bottle interface. Once the removable aerator bottle is sealed in position, the gas supply mechanism is activated (either manually or electronically depending upon the type of device) to transfer $CO_2$ from the gas cylinder to the liquid in the chamber of the sealed removable aerator bottle, thereby carbonating the liquid. Depending upon the desired level of carbonation, the gas supply mechanism may be activated one or more times to transfer the desired quantity of $CO_2$ to the liquid. Once carbonated to the desired level, the removable aerator bottle is removed from the device by a user and the carbonated liquid may be consumed. If the carbonated liquid is intended to be flavoured, a flavouring (typically in the form of a flavouring syrup) may be added to the carbonated liquid in the removable aerator bottle after the removable aerator bottle has been removed from the device.

BRIEF SUMMARY

The present applicant has identified a desire for an improved aerator device that offers greater flexibility than prior art domestic carbonator devices whilst providing enhanced functionality with minimal additional complexity.

In accordance with a first aspect of the present invention, there is provided apparatus for the preparation of aerated (e.g. carbonated) drinks, comprising: an aerator stage comprising: a removable aerator bottle defining a chamber for receiving a liquid (e.g. water) to be aerated; an aerator bottle interface operative to engage the removable aerator bottle and seal the chamber thereof; a gas inlet line operative to fluidly connect a gas source (e.g. replaceable gas (e.g. $CO_2$) cylinder) to the aerator bottle interface; and a gas supply mechanism for controlling supply of gas from the gas source to the aerator bottle interface via the gas inlet line; and an aerated liquid dispenser stage comprising: an aerated liquid dispenser outlet; a liquid outlet line operative to fluidly connect the aerator bottle interface to the aerated liquid dispenser outlet to allow aerated liquid to flow from the chamber of the removable aerator bottle to the aerated liquid dispenser outlet; and a liquid flow controller for controlling discharge of aerated liquid from the removable aerator bottle to the aerated liquid dispenser outlet via the liquid outlet line.

In one embodiment, the apparatus further comprises: a gas outlet line including a gas outlet provided in the aerator bottle interface; and a pressure control stage comprising: a gas reservoir connected to the gas outlet line and operative to store pressurised gas received from the removable aerator bottle during an initial aeration step; and an exhaust mechanism operative to vent gas from the removable aerator bottle during a subsequent venting step in order to lower the level of gas pressure in the removable aerator bottle prior to discharge of the aerated liquid from the removable aerator bottle via the aerated liquid dispenser stage.

In this way, a domestic (e.g. portable) device is provided that allows preparation (e.g. one drink at a time) of aerated drinks and provides the user with the option of serving the aerated drink from the removable aerator bottle (as per a conventional domestic carbonator) or via the aerated liquid dispenser outlet in which initial aeration is carried out at a first (elevated) pressure suited to initial aeration stage and dispensing of the aerated drink is carried out at a second (lower) pressure which may ensure better retention of aeration in certain situations. For the purposes of the present specification, the term “aerated” and its equivalents are used herein to refer generally to the addition of any gas to a liquid. The term “carbonated” and its equivalents are used herein to refer to the addition of $CO_2$ gas to a liquid.

In one embodiment, the apparatus further comprises a flavouring liquid (e.g. flavouring syrup) dispenser stage comprising: a flavouring liquid dispenser comprising a flavouring liquid dispenser outlet, wherein the flavouring liquid dispenser comprises a flavouring liquid dispenser mechanism that is activated by gas pressure (e.g. developed in the head of the chamber during the aeration process and supplied via the gas outlet line to the gas reservoir during the initial aeration stage).

In one embodiment, the flavouring liquid dispenser mechanism is driven by gas pressure from the gas reservoir.

In this way, apparatus is provided including a flavouring liquid dispenser operated using gas pressure that would be discarded in a conventional domestic carbonator device. Advantageously, the provision of the gas reservoir allows gas-driven operation of the flavouring liquid dispenser to be carried out at a different (e.g. higher) pressure to the aerated liquid dispensing process and better suited to driving the flavouring liquid dispenser mechanism.

In one embodiment, the gas reservoir comprises a chamber fluidly connected (e.g. in parallel in or in series) to the gas outlet line.

In one embodiment, the chamber is connected to the gas outlet line via a directional flow valve (e.g. non-return valve).

In one embodiment: the gas supply mechanism is operative to raise gas pressure in the removable aerator bottle to a first pressure $P_1$ during the initial aeration stage; and the pressure control stage is operative via the exhaust mechanism to lower the gas pressure in the removable aerator bottle to a second pressure $P_2$ (e.g. by reference to a pressure sensor) during the subsequent venting step (e.g. prior to discharge of the aerated liquid).

In one embodiment, the gas reservoir is operative to receive and store pressured gas at substantially the first pressure $P_1$.

In one embodiment, $P_2<0.8*P_1$ (e.g. $P_2<0.7*P_1$, e.g. $P_2<0.6*P_1$, e.g. $P_2<0.5*P_1$, e.g. $P_2<0.4*P_1$).

In one embodiment, the exhaust mechanism comprises an exhaust valve.

In one embodiment, the exhaust valve is fluidly coupled to the gas outlet line (e.g. at a point between the gas outlet in the aerator bottle interface and the gas outlet valve, e.g. at a point between the gas outlet in the aerator bottle interface and the gas reservoir).

In one embodiment, the gas reservoir has a gas storage capacity configured for multiple operation of the flavouring liquid dispenser mechanism (e.g. to sequentially activate the release of first and second shots of flavouring liquid via the flavouring liquid dispenser mechanism (e.g. for larger removable aerator bottle systems).

In one embodiment, the liquid flow controller comprises a valve (e.g. solenoid valve).

In one embodiment, the liquid flow controller further comprises a flow regulator operative to maintain a substantially constant flow rate (e.g. substantially constant volumetric flow rate) of aerated liquid from the liquid dispenser outlet as aerated liquid is discharged from the removable aerator bottle to the aerated liquid dispenser outlet.

In one embodiment, the apparatus is configured to transfer aerated liquid from the removable aerator bottle to the aerated liquid dispenser outlet using gas pressure in the sealed chamber (e.g. pressure developed in a headspace of the sealed chamber during the aeration step).

In another embodiment, the apparatus further comprises a pump (e.g. air pump) operative to supply pressurised gas (e.g. pressurised air) to the removable aerator bottle for transferring aerated liquid from the removable aerator bottle to the aerated liquid dispenser outlet.

In one embodiment, the pressure control stage is operative to lower the gas pressure in the removable aerator bottle (e.g. to substantially atmospheric pressure) during the subsequent venting step prior to allowing pressurised gas from the pump to enter the removable aerator bottle (e.g. enter the head of the chamber thereof).

In one embodiment, the pump is operative to supply pressurised gas at substantially constant pressure (e.g. at a pressure $P_3$, wherein $P_3<P_1$).

In one embodiment, the liquid outlet line comprises a dip tube having an opening for receiving aerated liquid positioned at a lower (lowermost) part of the chamber when the removable aerator bottle is engaged by the aerator bottle interface. In one embodiment, the dip tube is supported by the aerator bottle interface.

In on embodiment, the flavouring liquid dispenser outlet is positioned adjacent the aerated liquid dispenser outlet (e.g. to allow both flavouring liquid and aerated liquid to be dispensed simultaneously into a receptacle, e.g. a drinking glass).

In one embodiment, the flavouring liquid dispenser outlet and aerated liquid dispenser outlet are configured (e.g. positioned) to perform in-air mixing of the flavouring liquid and aerated liquid. In one embodiment, the flavouring liquid dispenser outlet and aerated liquid dispenser outlet are configured to perform in-air mixing outside of the apparatus (e.g. inside of a receptacle placed beneath the adjacent flavouring liquid dispenser outlet and aerated liquid dispenser outlets).

In one embodiment, the flavouring liquid dispenser stage further comprises a gas outlet valve for controlling discharge of gas from the gas reservoir to the flavour dispenser mechanism (e.g. via the gas outlet line).

In one embodiment, the gas outlet valve is provided between the flavouring liquid dispenser mechanism and the gas reservoir.

In one series of embodiments, the flavouring liquid dispenser is configured to dispense flavouring liquid from a flavour capsule (e.g. single-use/single-serving flavour capsule) received in the flavouring liquid dispenser.

In one embodiment, the flavouring liquid dispenser mechanism is operative to perform one or more of the following functions: open (e.g. rupture) a flavour capsule received in the flavouring liquid dispenser; drive flavouring liquid from the opened flavour capsule towards the flavouring liquid dispenser outlet (e.g. drive the flavouring liquid out from the opened flavour capsule and towards the flavouring dispenser outlet).

In one embodiment, the flavouring liquid dispenser mechanism comprises a capsule dispensing (e.g. capsule opening mechanism such as a piston) mechanism operative to apply a dispensing force to a flavour capsule received in the flavouring liquid dispenser (e.g. to urge the flavour capsule against an opening (e.g. rupturing) member and/or to drive the flavouring liquid out from the opened flavour capsule (e.g. by collapsing the flavour capsule).

In one embodiment, the capsule opening mechanism is driven by (e.g. directly by) gas pressure from gas stored in the gas reservoir.

In one embodiment, the flavour capsule is as defined in accordance with any embodiment of the fourth aspect of the invention.

In one embodiment, the apparatus further comprises a controller (e.g. electronic controller) for operating one or more of: the gas supply mechanism; the liquid flow controller mechanism; the flavouring liquid dispenser stage (e.g. the gas outlet valve); and the exhaust mechanism.

In one embodiment, the electronic controller is operative to open the exhaust mechanism to lower the pressure in the removable aerator bottle to the second pressure $P_2$ (i.e. partially exhaust the chamber of the removable aerator bottle) prior to actuating the liquid flow controller mechanism.

In the case of apparatus comprising a controller operative to control operation of the gas supply mechanism, the flavour capsule may comprise a machine-readable identifier (e.g. barcode).

In one embodiment, the apparatus is operative to read the machine-readable identifier (e.g. using a sensor) and electronic controller is operative to select a dispensing parameter (e.g. degree of aeration and/or water volume required) based on the machine-readable identifier.

In another series of embodiments, the flavouring liquid dispenser is configured to dispense flavouring liquid (e.g. flavouring syrup) from a bulk container (e.g. received by the flavouring liquid dispenser). The bulk container is configured to store sufficient flavouring liquid to make multiple drinks (e.g. 10 or more measures of flavouring liquid, e.g. 20 or more measures of flavouring liquid).

In one embodiment, the flavouring liquid dispenser mechanism comprises a bulk container dispenser module associated with the bulk container.

In one embodiment, the bulk container dispenser module is driven by (e.g. directly by) gas pressure from gas stored in the gas reservoir.

In one embodiment, the bulk container dispenser module is configured to receive/engage the removable bulk container.

In another embodiment, the bulk container dispenser module is integrated into the bulk container.

In one embodiment, the bulk container dispenser module includes the flavouring liquid dispenser outlet.

In one embodiment, the bulk container is a variable volume (e.g. collapsible) container.

In another embodiment, the bulk container is fixed volume (e.g. non-collapsible or rigid) container.

In the case of a fixed volume container, in one embodiment the bulk container may have an inlet for allowing gas (e.g. air or $CO_2$) to enter the bulk container as flavouring liquid is dispensed from the bulk container.

In one embodiment, the apparatus includes a gas collector (e.g. $CO_2$ collector) connectable to the inlet (e.g. connectable directly or via the bulk container dispenser module).

In one embodiment, the gas collector is configured to receive gas from the sealed chamber of the removable aerator bottle (e.g. as pressure is developed in the head of the chamber during the aeration process or during a subsequent exhaust cycle) or from the gas reservoir.

In one embodiment, the gas collector is an open (e.g. open bucket) gas collector.

In one embodiment, the bulk container dispenser module comprises a chamber (e.g. metering chamber) configured to receive flavouring liquid from the bulk container.

In one embodiment, the bulk container dispenser module comprises a directional valve (e.g. non-return flap valve) operative to allow flavouring liquid to flow from the bulk container to the chamber.

In one embodiment, the bulk container dispenser module comprises a diaphragm movable between a first (e.g. retracted) configuration (e.g. first position) and a second (e.g. advanced) configuration (e.g. second position) with dispensing of flavouring liquid occurring as the diaphragm moves from the first configuration to the second configuration.

In one embodiment, in the first configuration the chamber is configured to fill with flavouring liquid from the bulk container and movement of the diaphragm from the first configuration to the second configuration forces flavouring liquid to be dispensed from the chamber.

In one embodiment, movement from the second configuration to the first configuration allows the chamber to refill with flavouring fluid from the bulk container.

In one embodiment, movement from the first configuration to the second configuration occurs in response to a positive pressure from the gas reservoir.

In one embodiment, movement from the second configuration to the first configuration occurs in response to a negative pressure.

In one embodiment, the apparatus further comprises means (e.g. a suction device) operative to move the diaphragm from the second configuration to the first configuration.

In one embodiment, the suction device comprises a venturi nozzle operative to generate a negative pressure in the chamber as the gas collector is filled.

In one embodiment, the bulk container dispenser module further comprises a dispenser outlet valve (e.g. pressure-activated sleeve valve) for receiving flavouring liquid from the chamber.

In one embodiment, the bulk container dispenser module further comprises an outlet nozzle for receiving flavouring liquid from the dispenser outlet valve.

In one embodiment, two or more of the diaphragm, dispenser outlet valve and the outlet nozzle are provided as a single component (e.g. a one-piece diaphragm).

In one embodiment, the apparatus further comprises a electronic controller operative to control operation of the gas supply mechanism; and the bulk container comprises a machine-readable identifier; wherein the apparatus is operative to read the machine-readable identifier and electronic controller is operative to select a dispensing parameter (e.g. degree of aeration and/or water volume required) based on the machine-readable identifier.

In one embodiment, the gas supply mechanism comprises a gas supply valve operative to selectively permit gas to flow from the gas supply.

In one embodiment, the gas supply mechanism comprises a pivotable valve actuation member configured to operate the gas supply valve. In one embodiment, the pivotable valve actuation member is driven by a solenoid (e.g. electronically controlled solenoid).

In one embodiment, the aerator bottle interface comprises a gas inlet nozzle forming part of the gas inlet line, the gas inlet nozzle being configured to extend inside the chamber of the removable aerator bottle when the removable aerator bottle is engaged by the aerator bottle interface.

In one embodiment, the volume of the removable aerator bottle is no greater than substantially 2 litres (e.g. no greater than substantially 1.5 litres, (e.g. no greater than substantially 1 litre, no greater than substantially 0.5 litres).

In one embodiment, the removable aerator bottle comprises a base and an open top.

In one embodiment, the aerator bottle interface is configured to seal the open top of the removable aerator bottle.

In accordance with a second aspect of the present invention, there is provided a bulk container dispenser module for use with a bulk container.

In one embodiment, the bulk container dispenser module is driven by (e.g. directly by) gas pressure from gas stored in a gas reservoir.

In one embodiment, the bulk container dispenser module is configured to receive/engage the removable bulk container.

In another embodiment, the bulk container dispenser module is integrated into the bulk container.

In one embodiment, the bulk container dispenser module includes a flavouring liquid dispenser outlet.

In one embodiment, the bulk container is a variable volume (e.g. collapsible) container.

In another embodiment, the bulk container is fixed volume (e.g. non-collapsible or rigid) container.

In the case of a fixed volume container, in one embodiment the bulk container may have an inlet for allowing gas (e.g. air or $CO_2$) to enter the bulk container as flavouring liquid is dispensed from the bulk container.

In one embodiment, the bulk container dispenser module comprises a chamber (e.g. metering chamber) configured to receive flavouring liquid from the bulk container.

In one embodiment, the bulk container dispenser module comprises a directional valve (e.g. non-return flap valve) operative to allow flavouring liquid to flow from the bulk container to the chamber.

In one embodiment, the bulk container dispenser module comprises a diaphragm movable between a first (e.g. retracted) configuration (e.g. first position) and a second (e.g. advanced) configuration (e.g. second position) with dispensing of flavouring liquid occurring as the diaphragm moves from the first configuration to the second configuration.

In one embodiment, in the first configuration the chamber is configured to fill with flavouring liquid from the bulk container and movement of the diaphragm from the first configuration to the second configuration forces flavouring liquid to be dispensed from the chamber.

In one embodiment, movement from the second configuration to the first configuration allows the chamber to refill with flavouring fluid from the bulk container.

In one embodiment, movement from the first configuration to the second configuration occurs in response to a positive pressure from the gas reservoir.

In one embodiment, movement from the second configuration to the first configuration occurs in response to a negative pressure.

In one embodiment, the bulk container dispenser module further comprises a dispenser outlet valve (e.g. pressure-activated sleeve valve) for receiving flavouring liquid from the chamber.

In one embodiment, the bulk container dispenser module further comprises an outlet nozzle for receiving flavouring liquid from the dispenser outlet valve.

In one embodiment, two or more of the diaphragm, dispenser outlet valve and the outlet nozzle are provided as a single component (e.g. a one-piece diaphragm).

In accordance with a third aspect of the present invention, there is provided a method of preparing an aerated liquid using an aerator device, the method comprising: filling a chamber of a removable aerator bottle with liquid; attaching the removable aerator bottle to an aerator bottle interface of the aerator device and sealing the chamber; during an initial aeration step, aerating the liquid in the chamber of the removable aerator bottle by transferring pressurised gas to the chamber; during or subsequent to the initial aerating step, transferring pressurised gas from the chamber to a gas reservoir connected to a gas outlet line; and subsequent to the preceding steps, lowering the gas pressure in the chamber of the removable aerator bottle (e.g. gas pressure in the head of the chamber of the removable aerator bottle) before transferring aerated liquid from the chamber of the removable aerator bottle to a receptacle via an aerated liquid dispenser outlet connected to the aerator bottle interface by a liquid outlet line substantially using the lowered gas pressure in the head of the chamber to discharge aerated liquid from the chamber of the removable aerator bottle; and dispensing a flavouring liquid from a flavouring liquid dispenser into the receptacle by supplying pressurised gas from the gas reservoir to a flavouring liquid dispense mechanism of the flavouring liquid dispenser to drive dispensing of the flavouring liquid.

In one embodiment, the initial aeration step comprises raising gas pressure in the removable aerator bottle to a first pressure $P_1$ and the step of lowering the gas pressure comprises lowering the gas pressure in the removable aerator bottle to a second pressure $P_2$.

In one embodiment, the step of transferring pressurised gas from the chamber to the gas reservoir comprises transferring gas to the gas reservoir for storage at substantially the first pressure $P_1$.

In one embodiment, the flavouring liquid dispenser has a flavouring liquid dispenser outlet positioned adjacent the aerated liquid dispenser outlet.

In one embodiment, the method further comprises substantially simultaneously dispensing flavouring liquid and aerated liquid into the receptacle (e.g. to achieve in-air mixing of the flavouring liquid and aerated liquid).

In one embodiment, the step of dispensing a flavouring liquid from the flavouring liquid dispenser comprises inserting a flavour capsule into the flavouring liquid dispenser and the pressurised gas supplied to the flavouring liquid dispenser drives a capsule opening mechanism to apply a dispensing force to the flavour capsule received in the flavouring liquid dispenser (e.g. to urge the flavour capsule against an opening (e.g. rupturing) member and/or to drive the flavouring liquid out from the opened flavour capsule (e.g. by collapsing the flavour capsule).

In another embodiment, the step of dispensing a flavouring liquid from the flavouring liquid dispenser comprises providing a bulk container (e.g. received by the flavouring liquid dispenser) and the pressurised gas supplied to the flavouring liquid dispenser drives operation of a bulk container dispenser module associated with the bulk container.

In one embodiment, the aerating device is a device as defined in accordance with any embodiment of the first aspect of the invention.

In one embodiment the flavour capsule is as defined in accordance with any embodiment of the fourth aspect of the invention.

In accordance with a fourth aspect of the present invention, there is provided a capsule (e.g. for an aerator device) comprising: a sealed collapsible container (e.g. flexible bag or concertina-type/bellows-type container) containing a fluid (e.g. dry or liquid fluid) to be dispensed; a cap mounted on an end portion of the collapsible container, the cap defining an outlet (e.g. central outlet) for dispensing the fluid; and at least one piercing element; wherein, in use, relative movement between the collapsible container and the cap (e.g. between the end portion of the collapsible container and the cap) causes the at least one piercing element to rupture the collapsible container, whereby the fluid is permitted to flow from the collapsible container to the outlet.

In one embodiment, the fluid to be dispensed is a dry fluid (e.g. powder).

In another embodiment, the fluid to be dispensed is a liquid (e.g. syrup or gel).

In one embodiment, the dispensing capsule is a flavour dispensing capsule and the fluid is a flavouring fluid (e.g. flavouring powder or flavouring liquid (e.g. flavouring syrup or flavouring gel)).

In one embodiment, the flavouring fluid is a flavouring liquid (e.g. flavouring syrup or flavouring gel).

In one embodiment, the at least one piercing element is provided on the cap.

In one embodiment, the at least one piercing element extends circumferentially around the outlet.

In one embodiment the at least one piercing element comprises a plurality of (e.g. circumferentially spaced around the outlet) elements.

In another embodiment, the at least one piercing element comprises a substantially annular cutting edge (e.g. enclosing the outlet).

In one embodiment, the collapsible container is configured to be urged against the at least one piercing element (e.g. by a piston of a flavouring dispenser).

In one embodiment, the end portion of the collapsible container comprises a burstable membrane portion facing the at least one piercing element.

In one embodiment, the substantially annular cutting edge is inclined relative to the burstable membrane portion (e.g. with a leading edge of the substantially annular cutting edge forming a piercing point).

In one embodiment, the end portion of the collapsible container is received by the cap.

In one embodiment, the end portion of the collapsible container is slidably received in the cap (e.g. with the end portion being trapped inside the cap but slidable between first and second trapped positions relative to the cap).

In a first series of embodiments, the capsule further comprises an outer sleeve defining a chamber for housing the collapsible container.

In one embodiment, the outer sleeve is configured to substantially enclose lateral sides of the collapsible container.

In one embodiment, the outer sleeve is configured to slidably receive a piston head (e.g. of a capsule opening mechanism).

In one embodiment, the collapsible container defines a piston contact surface (e.g. at a substantially opposed end of the collapsible container to the end portion).

In one embodiment, the piston contact surface is recessed relative to the outer sleeve.

In one embodiment, the outer sleeve is integrally formed with the cap (e.g. formed as a single piece).

In a second series of embodiments (e.g. without an outer sleeve), the cap further defines a removable collar part (e.g. tear-off collar part) configured to prevent relative movement between the collapsible container and the cap, wherein removal of the removable collar part allows relative movement between the collapsible container and the cap.

In one embodiment, the removable collar part is connected (e.g. frangibly connected) to an upper part (e.g. upper periphery) of the cap.

In one embodiment, the removable collar part substantially encloses a portion (e.g. lower portion) of the collapsible container.

In one embodiment, the removable collar part includes a protuberant pull tab.

In one embodiment, the cap further defines an inner sleeve for receiving the end portion of the collapsible container.

In one embodiment, the end portion of the collapsible container is moveable relative to the cap from a first position to a second position, wherein movement of end portion from the first position to the second position causes the at least one piercing element to rupture the collapsible container.

In one embodiment, a leading part of the end portion of the collapsible container is received in the inner sleeve when the collapsible container is in the first position and the end portion is configured to further advance into the inner sleeve as the collapsible container moves from the first position to the second position.

In one embodiment, the cap comprises a first retaining remember configured engage the end portion of the collapsible container when the collapsible container is in the first position and configured to prevent movement of the end portion of the collapsible container relative to the cap in a direction opposed to the advancement direction.

In one embodiment, the cap comprises a second retaining member configured to engage the end portion of the collapsible container when the collapsible container is in the second position and configured to prevent movement of the end portion of the collapsible container relative to the cap in a direction opposed to the advancement direction.

In one embodiment, one or more of the first and second retaining members comprises a rib (e.g. continuous or non-continuous circumferentially extending rib) defining a first end (e.g. trailing end relative to the advancement direction) having a tapered profile configured to permit movement of the end portion relative to the cap in the advancement direction (e.g. to form an inclined ramp surface to allow the end portion to be inserted into the cap).

In one embodiment, the or each rib further defines a second end (e.g. leading end relative to the advancement direction) configured to present movement of the end portion relative to the cap in the direction opposed to the advancement direction.

In one embodiment, the second end defines a profile extending substantially normal to the advancement direction/axis.

In one embodiment, the collapsible container comprises a body defining a folding bellows profile.

In one embodiment, the collapsible container comprises a body defining a flexible pouch profile.

In one embodiment, the body (e.g. body with a folding bellows profile or flexible pouch profile) defines a fluid storage chamber for receiving a fluid and an opening to the fluid storage chamber at the leading end thereof.

In one embodiment, the opening is sealed by a burstable membrane portion.

In one embodiment, the aerating device is a device as defined in accordance with any embodiment of the first aspect of the invention.

In accordance with a fifth aspect of the present invention, there is provided a capsule (e.g. capsule for an aerator device) comprising: a (e.g. substantially rigid-walled) container defining a chamber containing a fluid to be dispensed (e.g. dry or liquid fluid); and a plunger sealing the chamber of the container, the plunger being movable relative to the container between a first position and a second position; wherein the container and the plunger have interengageable parts comprising a frangible seal portion and a puncturing element (e.g. internal puncturing element), the frangible seal portion being configured to form, when punctured by the puncturing element, at least one aperture in the container for dispensing the fluid from the chamber; wherein, in use, relative movement of the plunger relative to the container from the first position to the second position causes the puncturing element to puncture the frangible seal portion to form the at least one aperture; wherein movement of the plunger relative to the container from the first position to the second position occurs in an advancement direction and the plunger is further movable in the advancement direction between the second position and a third position relative to the container, wherein movement of the plunger relative to the container from the second position to the third position reduces the volume of the chamber bounded by the container and the plunger, and urges the fluid to flow out of the chamber and through the at least one aperture; wherein the movement of the plunger relative to the container from the first position to the second position comprises relative movement of a localised portion (e.g. central portion) of one of the plunger or container relative to an adjacent portion (e.g. surrounding outer portion) of said one of the plunger or container.

In this way, a capsule is provided in which breaking of the frangible seal portion may be achieved with minimal reduction of the volume of the chamber bounded by the container and the plunger during the initial movement from the first position to the second position and hence minimal resistance to drive piston advancement.

In one embodiment, the fluid to be dispensed is a dry fluid (e.g. powder).

In another embodiment, the fluid to be dispensed is a liquid (e.g. syrup or gel).

In one embodiment, the dispensing capsule is a flavour dispensing capsule and the fluid is a flavouring fluid (e.g. flavouring powder or flavouring liquid (e.g. flavouring syrup or flavouring gel)).

In one embodiment, the localised portion is a central portion and the adjacent portion is a surrounding outer portion (e.g. substantially annular surrounding outer portion).

In one embodiment, the localised portion moves from a retracted position to an advanced position relative to the adjacent portion as the plunger moves relative to the container from the first position to the second position.

In one embodiment, movement of the plunger relative to the container from the second positon to the third position comprises movement of at least the adjacent portion of said one of the plunger or container (e.g. movement of the localised portion and adjacent portion of said one of the plunger or container). In one embodiment, substantially the whole plunger moves relative to the container during movement from the second position to the third position.

In one embodiment, the plunger comprises a piston engaging surface.

In one embodiment, the localised portion is provided on the plunger. In this embodiment, the localised portion may be associated with a raised section of the piston engaging surface. In one embodiment, the raised section of the piston engaging surface is configured to move into a position substantially level with a piston engaging surface of the adjacent portion of the plunger.

In another embodiment, the localised portion is provided on the container (e.g. base portion of the container).

In one embodiment, the puncturing element is provided on the localised portion (so that movement of the localised portion advances the puncturing element towards the frangible seal). However, in another embodiment the frangible seal may be provided on the localised portion (so that movement of the localised portion advances the frangible seal towards the puncturing element).

In one embodiment, the localised portion comprises an advanceable member (e.g. advanceable central member) coupled to the adjacent portion.

In one embodiment, the advanceable member comprises a pivotable or flexible member (e.g. pivotable or flexible central member).

In one embodiment, the localised portion comprises a pivotable frustoconical member.

In one embodiment, the localised portion comprises a flexible domed member.

In one embodiment, the localised portion comprises a flexible convolute (e.g. flexible rolling convolute) member.

In one embodiment, the interengageable parts are configured to form the at least one aperture with a predetermined aperture profile. In this way, a flavour capsule may be provided that is operative to from a controlled flow path for dispensing the fluid (e.g. at a predetermined rate).

In one embodiment, in the first position an air space is provided in the chamber above the fluid, the air space being configured to allow relative movement from the first position to the second position substantially without compression of the fluid.

In one embodiment, as the plunger moves from the second position to the third position, the volume of the chamber bounded by the container and the plunger is reduced to substantially zero.

In one embodiment, the plunger is slidably mounted within the chamber (e.g. with a trailing end of the plunger being trapped inside the chamber but slidable between the second and third positions).

In one embodiment, the container comprises a proximal (e.g. upper) end and a distal (e.g. lower) end.

In one embodiment, the chamber defines an opening at the proximal end for receiving the plunger.

In one embodiment, the chamber comprises a peripheral chamber wall extending between the frangible seal portion and the opening (e.g. between the base of the container and the opening).

In one embodiment, the plunger comprises a head portion comprising a peripheral sealing surface configured to seal against an inner surface (e.g. inner peripheral surface) of the peripheral chamber wall.

In one embodiment, the peripheral sealing surface of the head portion is configured to seal against the inner surface of the peripheral chamber wall by virtue of deformation of the peripheral chamber wall.

In one embodiment, the inner surface of the peripheral chamber wall is tapered (e.g. has a cross-sectional area that decreases with increased distance from the opening).

In one embodiment, the peripheral sealing surface of the head portion comprises one or more sealing elements (e.g. resilient sealing rings) operative to seal against the inner surface of the peripheral chamber wall.

In one embodiment, the puncturing element comprises an elongate shaft (e.g. central shaft). In the first position, the elongate shaft may substantially extend through a full height of the fluid to a point adjacent the frangible seal portion.

In one embodiment, the puncturing element is provided on the plunger and the frangible seal portion is provided on the container. However, in another embodiment the puncturing element may be provided on the container and the frangible seal portion is provided on the plunger.

In the case that the frangible seal portion is provided on the container, in one embodiment the frangible seal portion is provided on the base of the container (e.g. a central location on the base of the container).

In one embodiment, the base of the container has an inner face with a sloped profile operative to direct the fluid towards the frangible seal portion.

In one embodiment, the plunger has an inner face (e.g. trailing inner face in the case that the puncturing element is provided on the plunger) with a corresponding sloped profile to the inner face of the base of the container, whereby in the third position the inner face (e.g. trailing inner face) of the plunger substantially engages the inner face of the base of the container e.g. to allow the fluid to be substantially evaluated from the container when the plunger is in the third position).

In one embodiment, when the localised portion is in the advanced position opposed inner faces of the plunger and the base of the container are configured such that the inner face (e.g. trailing inner face of the plunger in the case that the puncturing element is provided on the plunger) of the plunger substantially engages the inner face of the base of the container (e.g. to allow the fluid to be substantially evaluated from the container when the plunger is in the third position).

In the case that the puncturing element is provided on the plunger, in one embodiment the puncturing element extends from the head portion of the plunger towards the frangible seal portion.

In one embodiment, the puncturing element comprises: a leading aperture forming part (e.g. aperture forming tip or spike); and a trailing aperture engaging part (e.g. aperture engaging shaft).

In one embodiment, the trailing aperture engaging part of the puncturing element and the frangible seal portion comprise first and second cross-sectional forms configured such that, when the trailing aperture engaging part is engaged in the aperture formed by the leading aperture forming part rupturing the frangible seal portion, the first and second cross-sectional forms combine to create at least one flow gap around the trailing aperture engaging part.

In one embodiment, the first and second cross-sectional forms combine to create a predetermined configuration of n flow gaps around the trailing aperture engaging part that together form an outlet for the fluid to flow through.

In one embodiment, the n flow gaps are circumferentially spaced (e.g. substantially equally circumferentially spaced) relative to a central axis of the frangible seal portion.

In one embodiment, the first cross-sectional form is a substantially circular form.

In one embodiment, in the second cross-sectional form is an n-pointed star form (e.g. cruciform) or an n-sided polygonal form. However, any combination of first and second cross-sectional forms (e.g. combination of differently-shaped first and second cross-sectional forms) that results in the formation of n (e.g. predictably-sized) flow gaps may be suitable to achieve the desired technical effect.

In one embodiment, the first cross-sectional form (e.g. substantially circular from) has a cross-sectional area $A_1$ and the second cross-sectional form (e.g. n-sided polygonal from) has a cross-sectional area $A_2$. In one embodiment, $A_2>A_1$.

In one embodiment, the trailing aperture engaging part of the puncturing element comprises the first cross-sectional form and the frangible seal portion comprises the second cross-sectional form. However, in another embodiment the frangible seal portion may comprise the first cross-sectional form and the trailing aperture engaging part of the puncturing element may comprise the second cross-sectional form. In another embodiment, each of the trailing aperture engaging part of the puncturing element and the frangible seal portion define parts of the first and second cross-sectional forms (e.g. half of one form and half of the other).

In one embodiment, the frangible seal portion defines a displaceable flap profile comprising a plurality of circumferentially spaced lines of weakness extending radially from a central axis (e.g. central outlet axis) and dividing the frangible seal portion into a plurality of displaceable flap portions.

In one embodiment, the displaceable flap profile comprises a plurality of circumferentially spaced radially extending displaceable flaps each extending from the central axis to a respective end region (e.g. with each neighbouring pair of flaps being separated by a line of weakness extending from the central axis and terminating at an end region).

In one embodiment, each of the plurality of displaceable flaps are formed by a bendable thin wall section (e.g. bendable thin wall section of plastics material).

In one embodiment, each of the plurality of lines of weakness are formed by a rupturable thin wall section (e.g. rupturable thin wall section of plastics material).

In one embodiment, each of the plurality of displaceable flaps has reinforced edges extending along the lines of weakness (e.g. to encourage the flaps to maintain their shape as the lines of weakness are broken by the puncturing action of the puncturing element).

In one embodiment, each displaceable flap has a reinforced hinge edge (e.g. formed by a reinforced region of material adjacent a notional hinge edge of the displaceable flap).

In one embodiment, the plurality of lines of weakness are substantially equally circumferentially spaced relative to the central axis.

In one embodiment, the plurality of lines of weakness of substantially equal radial length relative to the central axis.

In one embodiment, the plurality of displaceable flaps are substantially triangular flaps. In the case that the frangible seal portion comprises the second cross-sectional form, in one embodiment the displaceable flap profile is an n-sided polygonal displaceable flap profile.

In one embodiment, the n-sided polygonal displaceable flap profile comprises a plurality of n lines of weakness extending from the central axis and together define a plurality of n displaceable flaps (e.g. n substantially triangular displaceable flaps).

In one embodiment, $n\geq3$ (e.g. $n\geq4$, e.g. $n\geq5$, e.g. $n\geq6$).

In one embodiment, the first and second cross-sectional forms are configured such that when the n displaceable flaps are forced into an open position as the trailing aperture engaging part of the puncturing element fully engages the aperture formed by the leading aperture forming part, a plurality of n flow gaps are formed around the trailing aperture engaging part (one flow gap at each apex of the n-sided polygonal outer form).

In one embodiment, the capsule further comprises an outlet nozzle (e.g. substantially cylindrical outlet nozzle) provided downstream of the frangible seal portion (e.g. on an underside of the base of the container in the case that the frangible seal portion is provided on the container base) and operative to receive fluid from the at least one aperture.

In one embodiment, in the third position, a leading part of the puncturing element (e.g. leading part of the trailing aperture engaging part) extends substantially along a full length of the outlet nozzle to create a central fluid guide element.

In one embodiment, in the third position, the leading part of the puncturing element (e.g. tip of the puncturing element or a leading part of the trailing aperture engaging part) protrudes beyond an outlet opening of the outlet nozzle.

In one embodiment, the puncturing element is configured to direct fluid along an outer surface thereof and towards the tip of the puncturing element.

In one embodiment, the puncturing element is configured to direct multiple parallel fluid flows towards the tip and to recombine the fluid flows into one stream of fluid as the fluid leaves the tip.

In another embodiment, the puncturing element is configured to dispense multiple jets of fluid flow from the tip (e.g. by maintaining multiple parallel flows in parallel).

In one embodiment, the puncturing element is configured to be urged against the frangible seal portion by a force applied to an outer (upper or lower) surface of the plunger and/or an outer (upper or lower) surface of the container (e.g. by a (e.g. $CO_2$ driven) piston of a flavouring dispenser).

In one embodiment, the aerating device is a device as defined in accordance with any embodiment of the first aspect of the invention.

BRIEF DESCRIPTION OF THE DRAWINGS

Embodiments of the present invention will now be described by way of example with reference to the accompanying drawings in which:

FIGS. 7A and 7B are schematic cross-sectional views of a flavouring capsule in accordance with a second embodiment of the present invention for use in the aerator device of FIG. 1;

FIGS. 8A-8C are a schematic cross-sectional views of the flavouring capsule of FIGS. 7A-7B illustrating its operation;

FIG. 9 is a schematic cross-sectional view of a flavouring capsule in accordance with a further embodiment of the present invention for use in the aerator device of FIG. 1;

FIGS. 10A-10C are a schematic cross-sectional views of the flavouring capsule of FIG. 9 illustrating its operation;

FIG. 17 is a schematic perspective view of a further alternative container design for use with the flavouring capsule of FIG. 9 showing details of a second alternative frangible seal portion of the pierceable base portion;

FIGS. 18A-18D are schematic detailed views of the alternative frangible seal portion of FIG. 17 illustrating its operation;

FIG. 19 is a schematic perspective view of a first alternative plunger design for use in the capsule of FIG. 9;

FIGS. 20A and 20B are schematic cross-sectional views of the first alternative plunger design of FIG. 19 illustrating its operation;

FIG. 23A is schematic perspective view of a flavouring capsule in accordance with a yet further embodiment of the present invention for use in the aerator device of FIG. 1;

FIG. 23B is a cross-sectional views of the flavouring capsule of FIG. 23A;

FIGS. 24A-24C are schematic cross-sectional views of the flavouring capsule of FIG. 23A illustrating its operation;

DETAILED DESCRIPTION

Figure 1:
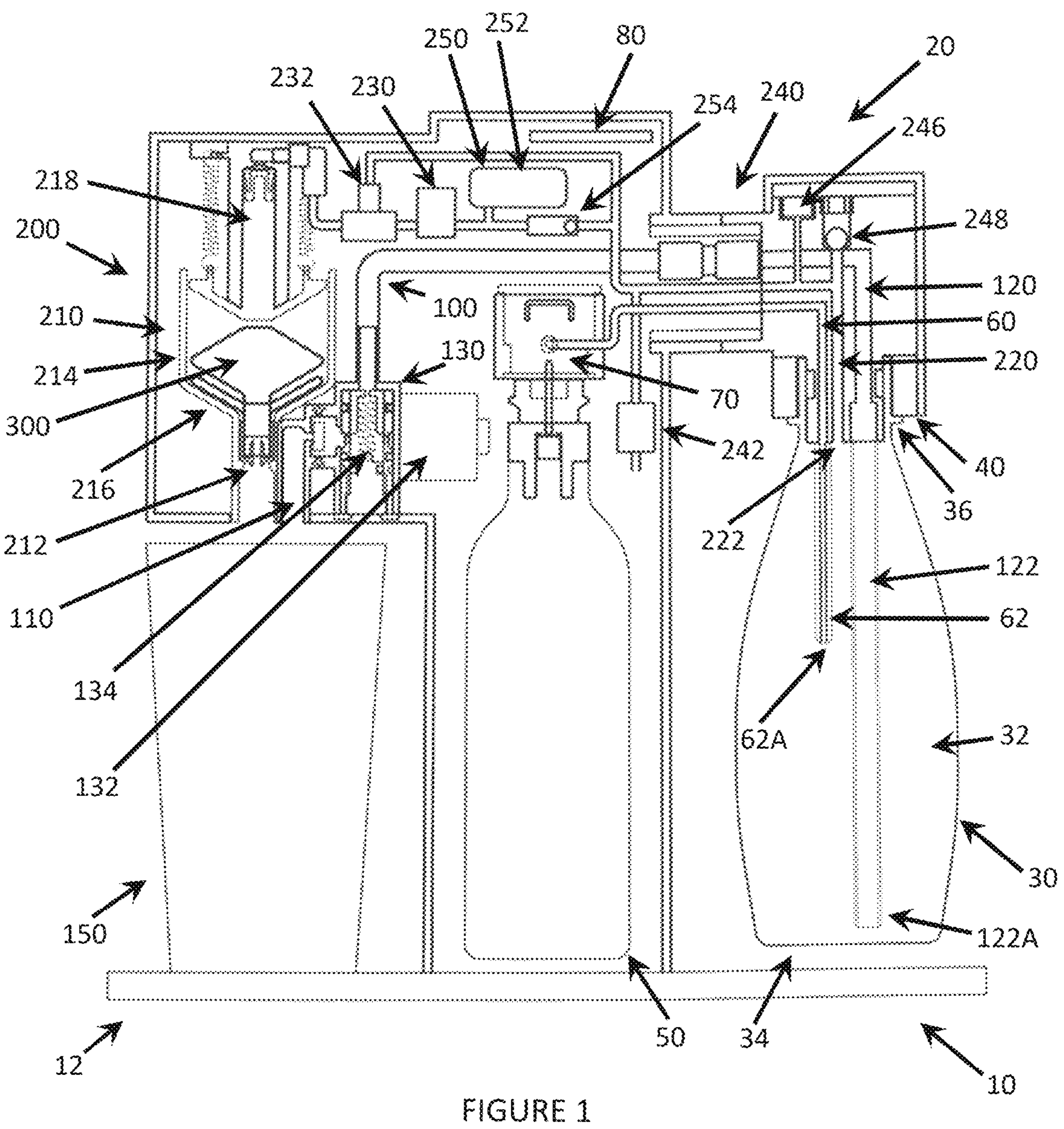
FIG. 1 is a schematic view of an aerator device in accordance with an embodiment of the present invention.
Figure 2:
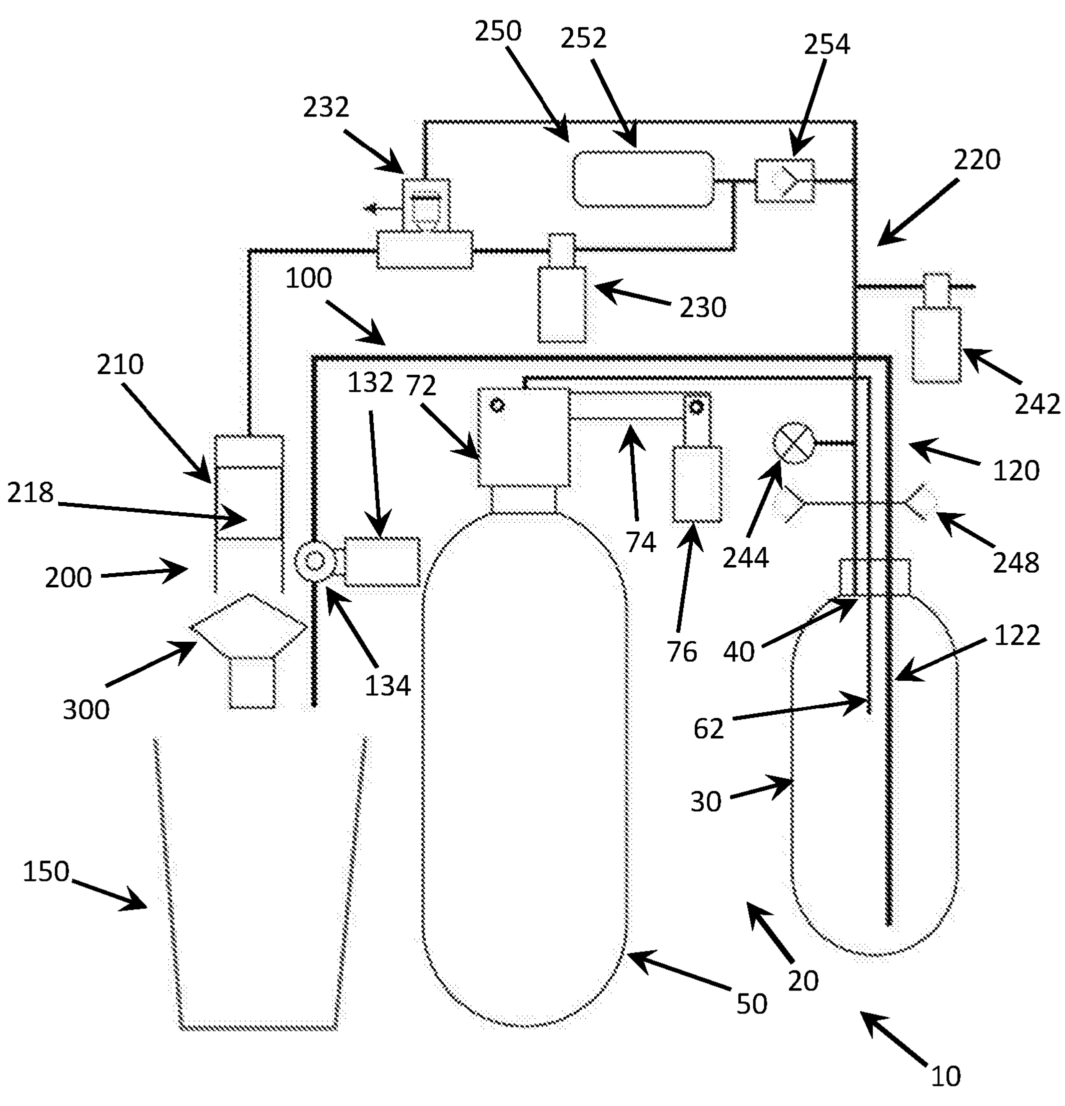
FIG. 2 is a schematic system view of the aerator device of FIG. 1.

FIGS. 1 and 2 show a portable domestic aerator device 10 for preparing aerated drinks, comprising a housing 12 and an aerator stage 20 comprising: a removable 450 ml aerator bottle defining a chamber 32 for receiving a liquid (typically water) to be aerated; an aerator bottle interface 40 operative to engage the removable aerator bottle 30 and seal chamber 32; a replaceable gas cylinder 50 containing pressurised $CO_2$ gas; a gas inlet line 60 operative to fluidly connect gas cylinder 50 to aerator bottle interface 40; and a gas supply mechanism 70 for controlling supply of gas from gas cylinder 50 to the aerator bottle interface 40 via gas inlet line 60.

Removable aerator bottle 30 comprises a base 34 and a tapered open top 36. Aerator bottle interface 40 is pivotable to enable attachment and removal of the removable aerator bottle 30 along an axis inclined to vertical and is configured to seal the open top 36 of the removable aerator bottle 30 when the aerator bottle 30 is fully engaged. Aerator bottle interface 40 comprises a gas inlet tube 62 forming part of the gas inlet line 60, the gas inlet tube 62 being configured to extend inside the chamber 32 of the removable aerator bottle 30 when the removable aerator bottle 30 is engaged by the aerator bottle interface 40 and having a gas inlet nozzle 62A for ejecting pressurised gas into liquid contained in chamber 32.

Figure 3:
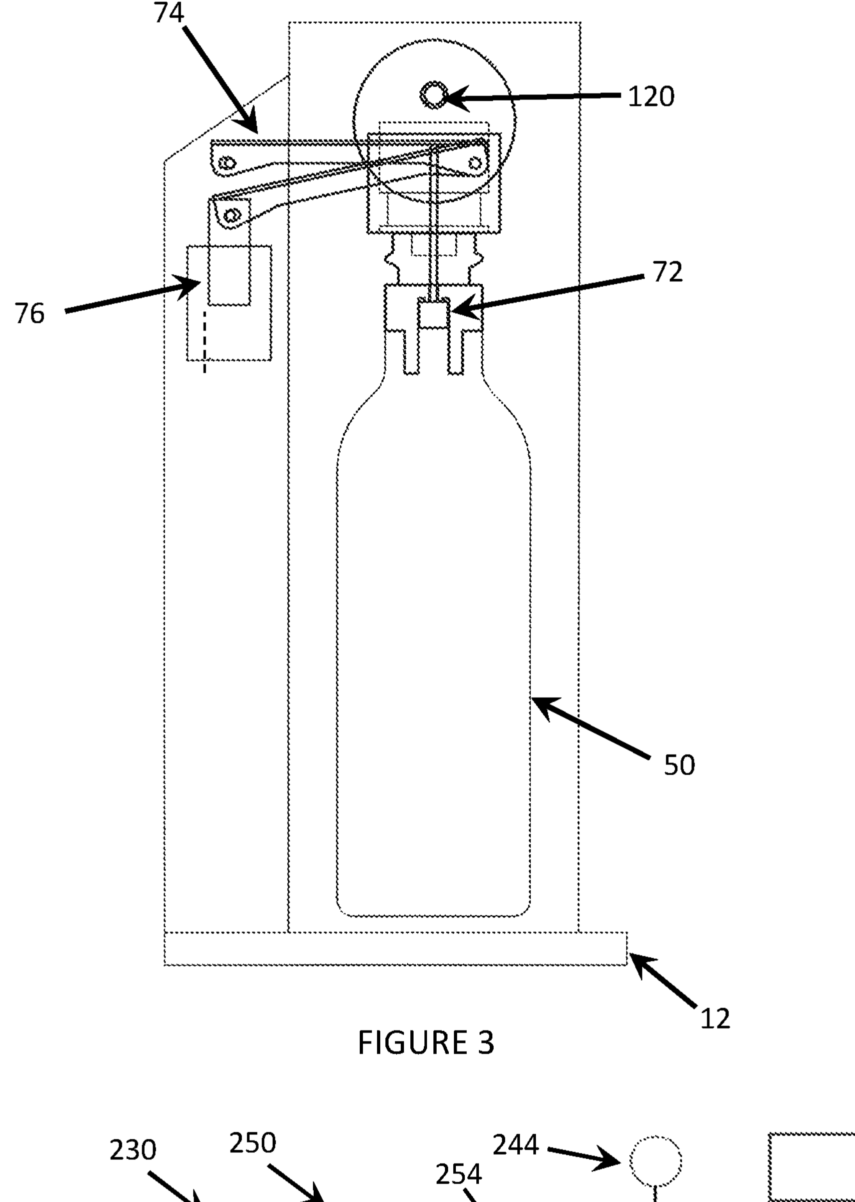
FIG. 3 is a schematic view of part of the aerator device of FIG. 1.

As shown in FIG. 3, gas supply mechanism 70 comprises a valve 72 operative to selectively permit gas to flow from gas cylinder 50 and a pivotable valve actuation member 74 driven by a gas supply mechanism solenoid 76.

In addition to aerator stage 20, aerator device 10 further includes an electronic controller 80 and two optionally activatable stages: an aerated liquid dispenser stage 100; and a flavour dispenser stage 200.

Aerated liquid dispenser stage 100 comprises an aerated liquid dispenser outlet 110 for dispensing aerated liquid into a drinking vessel 150; a liquid outlet line 120 operative to fluidly connect aerator bottle interface 40 to the aerated liquid dispenser outlet 110 to allow aerated liquid to flow from chamber 32 of removable aerator bottle 30 to aerated liquid dispenser outlet 110; and a liquid flow controller 130 for controlling discharge of aerated liquid from removable aerator bottle 30 to aerated liquid dispenser outlet 110 via liquid outlet line 120. Liquid flow controller 130 comprises a liquid flow solenoid valve 132 and a flow regulator 134.

Liquid outlet line 120 comprises a dip tube 122 supported by aerator bottle interface 40 having an opening 122A for receiving aerated liquid positioned at a lowermost part of chamber 32 when removable aerator bottle 30 is engaged by aerator bottle interface 40.

Flavour dispenser stage 200 comprises: a flavouring liquid dispenser 210 comprising a flavouring liquid dispenser outlet 212 and a flavour dispenser mechanism 214; a gas outlet line 220 operative to supply gas from the headspace of the removable aerator bottle 30 to flavouring liquid dispenser 210, the gas outlet line 220 including a gas outlet 222 provided in the aerator bottle interface 40; a gas outlet solenoid valve 230 for controlling discharge of gas from the removable aerator bottle 30 to the flavour dispenser mechanism 214 via the gas outlet line 220; a dump valve 232; and a pressure control stage 240 fluidly coupled to gas outlet line 220 between gas outlet 222 and gas outlet solenoid valve 230.

Flavouring liquid dispenser outlet 212 is positioned adjacent aerated liquid dispenser outlet 110 to allow both flavouring liquid and aerated liquid to be dispensed simultaneously into drinking vessel 150, with flavouring liquid dispenser outlet 212 and aerated liquid dispenser outlet 110 being positioned to perform in-air mixing of the flavouring liquid and aerated liquid within drinking vessel 150. In this way, the need to clean flavouring liquid from the apparatus after dispensing the flavouring liquid is minimised.

Flavour dispenser mechanism 214 comprises a flavour capsule receptacle 216 for receiving a single-use flavour capsule 300 and a pressure-driven piston 218. Piston 218 is activated via gas outlet line 220 by gas pressure from gas pressure developed in the head of chamber 32 of the removable aeration bottle 30 during the aeration process and acts as a syrup pump.

Figure 5:
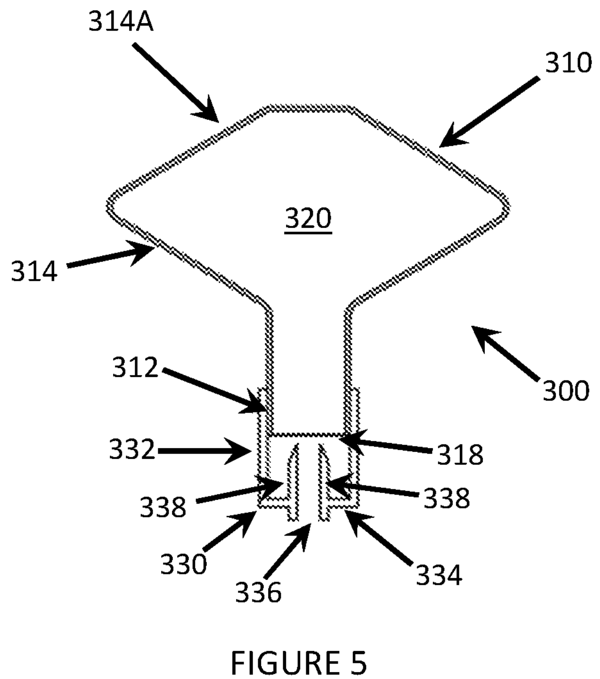
FIG. 5 is a schematic cross-sectional views of a flavouring capsule in accordance with a first embodiment of the present invention for use in the aerator device of FIG. 1.

As illustrated in FIG. 5, flavour capsule 300 comprises: a sealed collapsible container 310 containing a flavouring syrup 320; and a cap 330 defining a container receiving portion 332 for slidably receiving an end portion 312 of the collapsible container 310, and a base portion 334 defining a central outlet 336 for dispensing the flavouring syrup 320 and at least one piercing element 338 extending from the base portion 334 and extending circumferentially around the central outlet 336.

Collapsible container 310 comprises a flexible pouch part 314 defining a chamber 316 for receiving flavouring syrup 320, a piston contact surface 314A, a burstable membrane portion 318 sealing an opening to the chamber, the burstable membrane portion 318 being located at the end portion 312 of the collapsible container.

The at least one piercing element 338 may comprises a plurality of elements circumferentially spaced around central outlet 336 or a substantially annular cutting edge substantially enclosing central outlet 336.

Pressure control stage 240 comprises a gas reservoir 250 in the form of a 27 ml gas reservoir chamber 252 with an associated non-return valve 254, an exhaust solenoid valve 242 operable to release gas pressure in the chamber 32 to atmosphere, a pressure switch 244 and safety features in the form of a graphite bursting disc 246 and a mechanical pressure-release valve 248.

Electronic controller 80 is responsive to a user input to control operation of each of: gas supply mechanism solenoid 76; liquid flow solenoid valve 132; gas outlet solenoid valve 230; dump valve 232; and exhaust solenoid valve 242. Pressure switch 244 is used to monitor pressure in chamber 32 and instruct the system to: a) shut off gas supply mechanism solenoid 76 when an appropriate carbonisation pressure is reached in the chamber; and b) open the exhaust solenoid valve 242 to reduce pressure in the chamber to a predetermined aerated liquid dispense level.

In use, aerated liquid may be dispensed from aerator device 10 in two distinct ways: the user may either detach the removable aerator bottle 30 from aerator bottle interface 40 and dispense the aerated liquid from the removable aerator bottle 30 (e.g. if no flavouring is to be added or if flavouring from a bottle of flavouring liquid is desired) or they may maintain the sealed connection of the removable aerator bottle 30 to the aerator bottle interface 40 and activate controller to dispense the aerated liquid from the aerated liquid dispenser outlet 80 either with or without flavouring.

Upon activation of the aerator device 10, an initial aeration step commences in which electronic controller 80 opens gas supply mechanism solenoid 76 to aerate liquid contained in the removable aerator bottle. Typically this will generate a headspace pressure in the range of 6 to 10 bar and gas at this headspace pressure will collect in gas reservoir chamber 252 via the open gas outlet line 220.

If dispensing from the aerated liquid dispenser outlet is not required, the removable aerator bottle may be removed at this stage and the controller will discharge gas reservoir chamber 252 via dump valve 232 and exhaust solenoid valve 242.

Figures 6A, 6B, 6C:
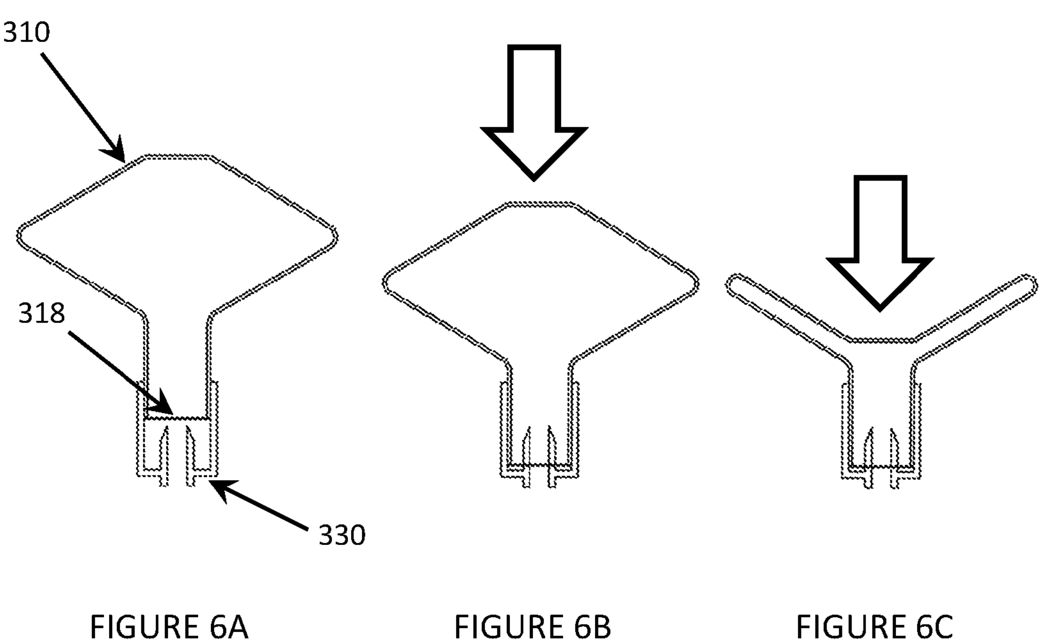
FIGS. 6A-6C are a schematic cross-sectional views of the flavouring capsule of FIG. 5 illustrating its operation.

If dispensing from the aerated liquid dispenser outlet is selected, electronic controller 80 opens exhaust solenoid valve 242 to reduce the headspace pressure to a preferred liquid transfer value (in this example to around 3 bar) before closing the exhaust solenoid valve 242 and opening liquid flow solenoid valve 132 to allow transfer of aerated liquid from removable aerator bottle 30 to aerated liquid dispenser outlet 80 via liquid outlet line 120 using gas pressure developed in the head of the sealed chamber 32 during the aeration process. Flow regular 104 maintains a substantially constant volumetric flow of aerated liquid from liquid dispenser outlet 80 as aerated liquid is discharged from removable aerator bottle 30 to the aerated liquid dispenser outlet 80. The discharge of aerated liquid from chamber 32 will continue until there is insufficient head pressure to continue If flavouring dispensing is selected, electronic controller 80 additionally opens gas outlet solenoid valve 230 in parallel to liquid flow solenoid valve 132 to allow transfer of pressurised gas from the gas reservoir chamber 252 to flavour dispenser mechanism 214 via gas outlet line 220. Since the gas in the gas reservoir chamber 252 is substantially at the initial aeration pressure, the flavour dispenser mechanism is driven by a higher pressure than the aerated liquid dispenser. The relatively higher pressure gas from gas reservoir chamber 252 causes drives piston 218 of flavour dispenser mechanism 214 towards the piston contact surface 314A of the installed flavour capsule 300 urging end portion 312 of collapsible container 310 towards base portion 334 of cap 330 and thereby causing the at least one piercing element 338 to rupture the burstable membrane portion 318 of collapsible container 310 to allow the flavouring syrup 320 to flow from the collapsible bag 310 to central outlet 336 (FIGS. 6A and 6B). Once the burstable membrane portion 318 is ruptured, gas pressure continues to drive piston 218 forward to substantially collapse collapsible container 310 and thereby drive substantially all of the flavouring syrup 320 from the flavour capsule 300 and out of flavouring liquid dispenser outlet 212 (FIG. 6C). In this way a metered dose (precise measurement of syrup to aerated liquid) may be added with flavour dispenser mechanism 214 being operated using gas pressure that would be discarded in a conventional domestic carbonator device.

Figure 4:
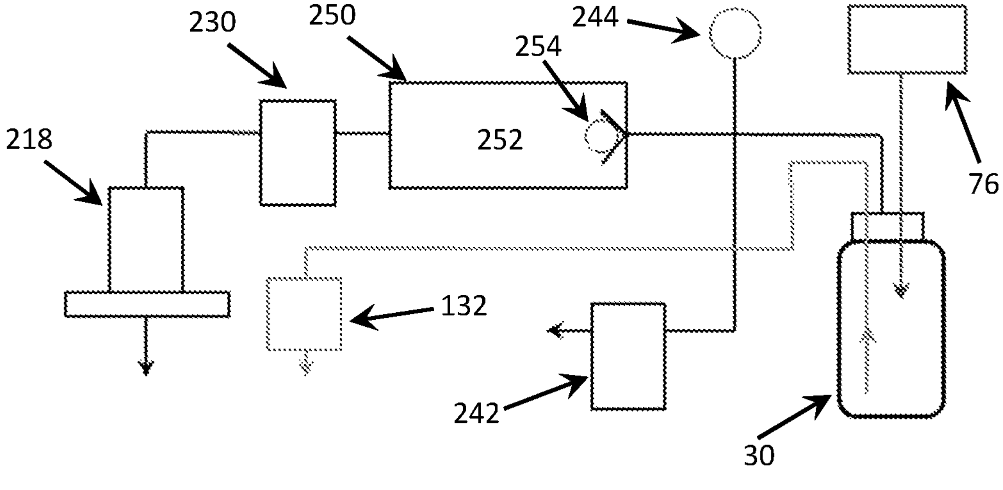
FIG. 4 is a schematic system view of parts of the aerator device of FIG. 1.

With reference to FIG. 4, an example of a typical sequence of operation is provided for the situation where dispensing from the aerated liquid dispenser outlet is selected in combination with flavouring dispensing:

Phase 1. Exhaust valve 242 closes;

Pause (0.2 seconds);

Gas supply valve 76 opens (pressure sensor set at 8 bar);

Pause (0.2 seconds).

Gas supply valve 76 closes.

Phase 2. Exhaust valve 242 opens (drops pressure to 3 bar);

Exhaust valve 242 closes;

Pause (0.5 seconds);

Liquid flow valve 132 opens (14 seconds);

Gas outlet solenoid valve 230 opens after 3 seconds;

Liquid flow valve 132 and gas outlet solenoid valve 230 close.

Phase 3. Exhaust valve 242 opens.

Advantageously, the provision of the gas reservoir 250 allows the gas pressure used for aerated liquid dispensing and for flavouring dispensing to be different and set at values best suited to the different tasks. For example, in some situations a lower pressure may be desirable for the aerated liquid dispensing step in order to ensure a desired level of retention of carbonation follow dispensing of the aerated liquid. Furthermore, the gas reservoir 250 may be sized to allow for multiple charges of pressurised gas (e.g. to allow the use of multiple flavouring capsules, which may be desirable for machines capable of accepting larger volume removable aerator bottles).

FIGS. 7A and 7B illustrate a first alternative embodiment of a flavour capsule 300' for use with a modified form of the aerator device 10 of FIG. 1, the flavour capsule 300' comprising: a sealed collapsible container 310' containing a flavouring syrup 320'; and a one-piece outer sleeve/cap 330' comprising an outer sleeve portion 331A for receiving a main body portion 314' of the collapsible container 310', and a cap portion 331B defining an inner sleeve 332' for slidably receiving an end portion 312' of the collapsible container 310', a base portion 334' defining a central outlet 336' for dispensing the flavouring syrup 320' and at least one piercing element 338' extending from the base portion 334' adjacent the central outlet 336'.

Main body portion 314' of collapsible container 310' has a folded bellows profile and defines a chamber 316' for receiving flavouring syrup 320', a piston contact surface 314A' and a burstable membrane portion 318' sealing an opening to the chamber 316', the burstable membrane portion 318' being located at the end portion 312' of the collapsible container.

As illustrated, cap portion 331B further comprises an intermediate sleeve 333 for slidably receiving a locking flange 312A provided on end portion 312' of the collapsible container, the intermediate sleeve 333 including first and second retaining members 333A, 333B featuring a tapered profile to enable advancement of the locking flange 312 in the advancement direction but prevent withdrawal of the locking flange 312 in the opposite direction, thereby retaining the collapsible container 310' in the one-piece outer sleeve/cap 330'.

In one embodiment, main body portion 314' is formed from high performance polyethylene (HPPE).

In one embodiment, the one-piece outer sleeve/cap 330' is formed from high density polyethylene (HDPE).

In one embodiment, the burstable membrane portion 318' is a welded HPPE membrane (e.g. welded in a process on the filling line).

With reference to FIGS. 8A-8C, advancement of piston 218 of aerator device 10 towards the piston contact surface 314A' of the installed flavour capsule 300' and urges end portion 312' of collapsible container 310' towards base portion 334' of cap 330' and thereby causing the at least one piercing element 338' to rupture the burstable membrane portion 318' of collapsible container 310' to allow the flavouring syrup 320' to flow from the collapsible container 310' to central outlet 336' (FIGS. 8A and 8B). Once the burstable membrane portion 318' is ruptured, gas pressure continues to drive piston 218' forward to substantially collapse collapsible container 310' and thereby drive substantially all of the flavouring syrup 320' from the flavour capsule 300' and out of flavouring liquid dispenser outlet 212 (FIG. 8C).

FIGS. 9-14 illustrate a second alternative embodiment of a flavour capsule 400 for use in aerator device 10.

Flavour capsule 400 comprises a two-part construction including a substantially rigid container 410 defining a chamber 420 containing a flavouring syrup 430; and a plunger 440 slidably mounted within and sealing the chamber 420 of the container. Container 410 comprises a proximal end 410A at which an opening 422 to chamber 420 is located and a distal end 410B forming a base 412 with a cylindrical outlet nozzle 414. An air space 426 is provided in the chamber above the flavouring syrup 430 to permit movement of plunger 440 from the first position to the second position substantially without requiring any compression of the flavouring syrup.

Figure 11B:
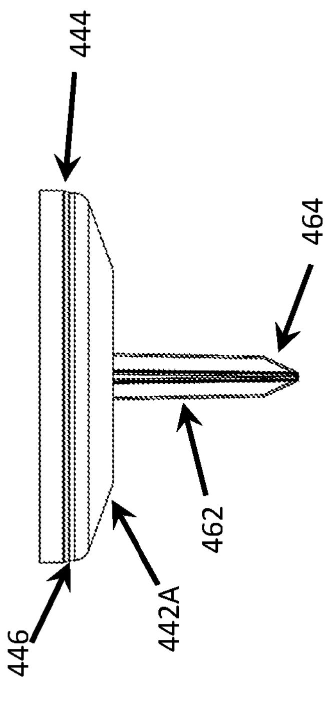
FIG. 11B is an exploded side view of the flavouring capsule of FIG. 9.
Figure 11B:
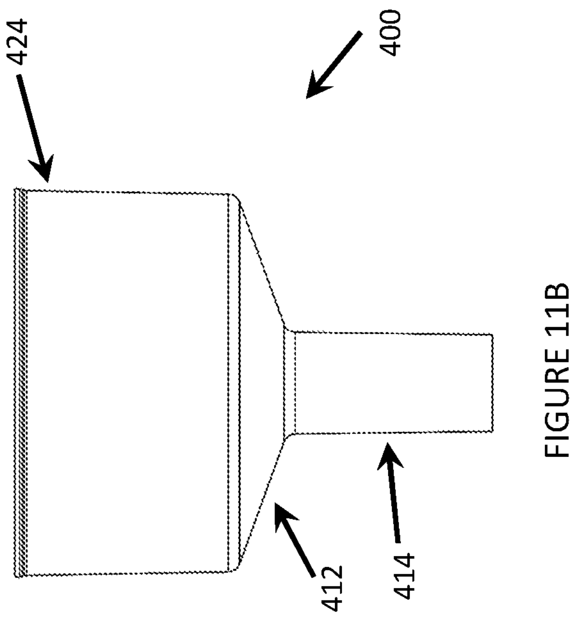
Figure 11A:
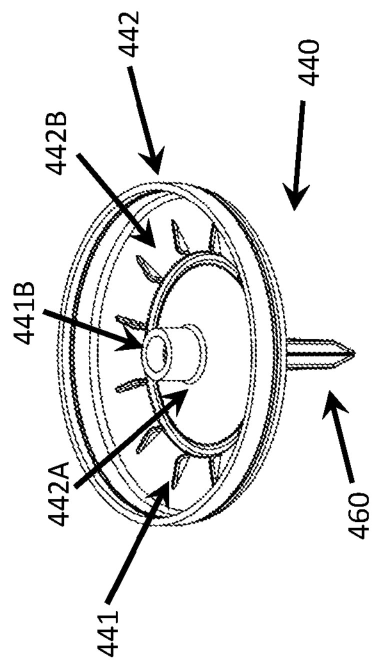
FIG. 11A is an exploded perspective view of the flavouring capsule of FIG. 9.
Figure 11A:
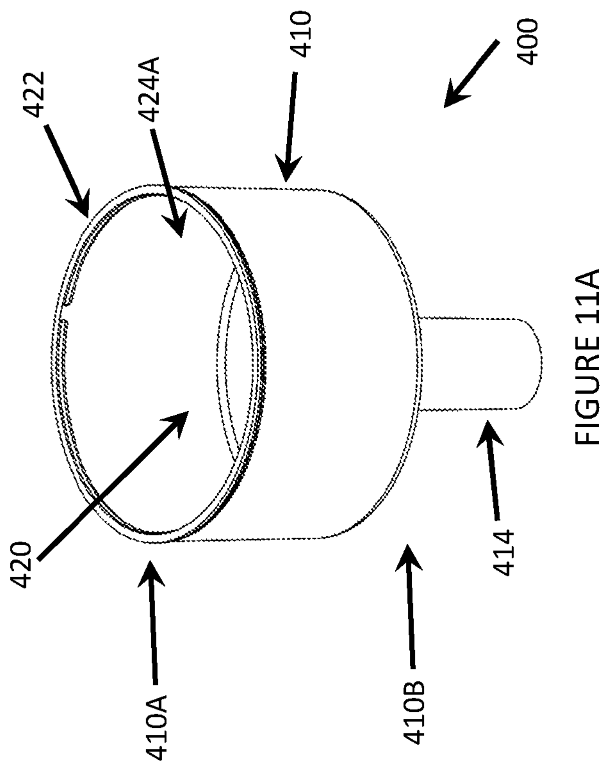
Figures 12A, 12B, 12C, 12D, 12E, 12F:
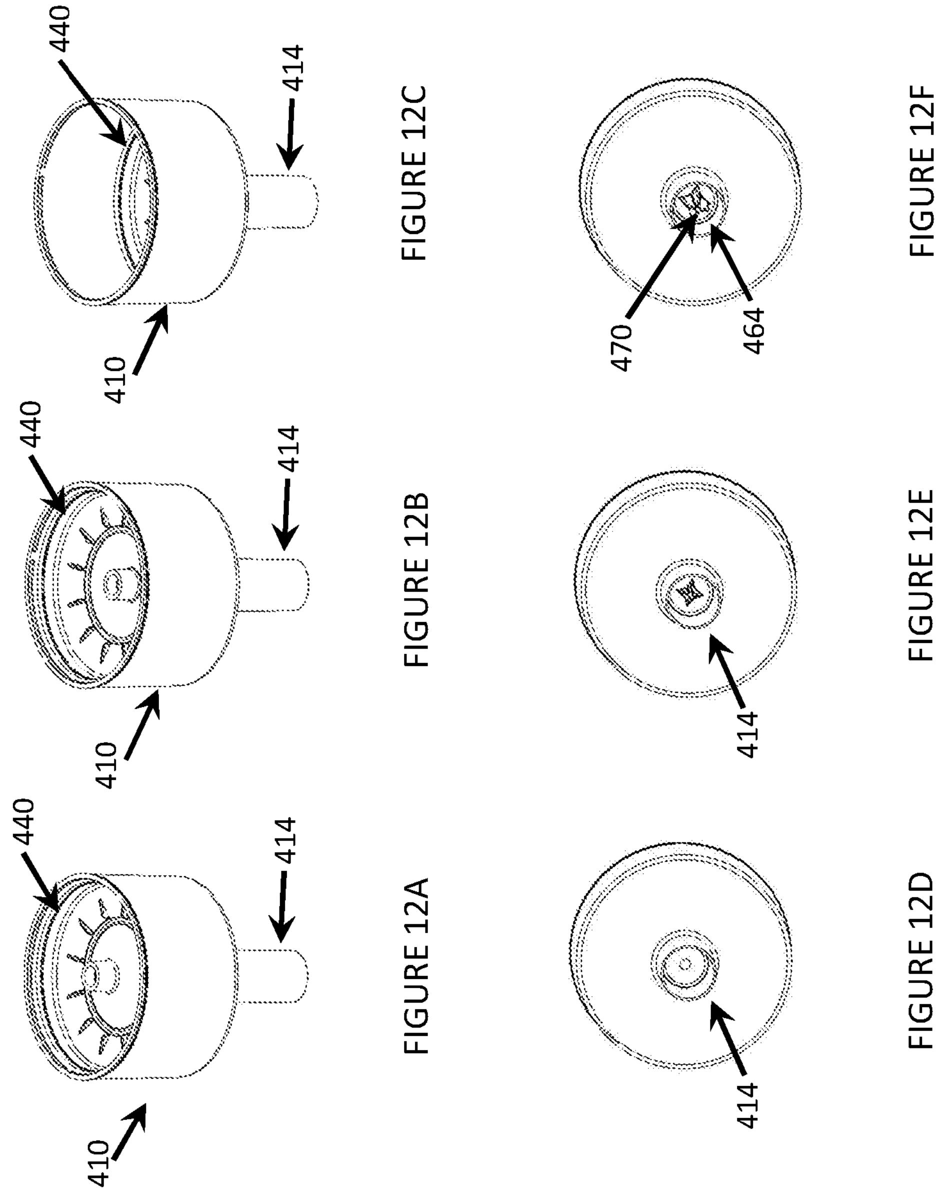
FIGS. 12A-12F are schematic perspective views of the flavouring capsule of FIG. 9 illustrating its operation.

As illustrated in FIGS. 11A-11B and 10, container 410 and plunger 440 have interengageable parts comprising a central frangible seal portion 450 provided on the base 412 of container 410 immediately above outlet nozzle 414 and a central puncturing element 460 provided on plunger 440. The frangible seal portion 450 is configured to form, when ruptured by the puncturing element 460, a central aperture 470 for dispensing the flavouring syrup.

As shown in FIGS. 11A and 11B, chamber 420 comprises a tapered peripheral chamber wall 424 extending between the base 412 of container 410 and opening 422, peripheral chamber wall 424 having cross-sectional area that decreases with increased distance from opening 422.

Plunger 440 comprises a head portion 442 comprising an upper surface 441 defining a piston contact surface 441A (including a raised central spigot section 441B and an annular surrounding portion 442B) configured to be engaged by piston 218 and a peripheral sealing surface 444 configured to seal against an inner peripheral surface 424A of peripheral chamber wall 424, the peripheral sealing surface 444 comprising at least one sealing ring 446. In view of the taper, the head portion 442 is configured to seal against the inner peripheral surface 424A of the peripheral chamber wall 424 by virtue of deformation of the peripheral chamber wall 424.

As illustrated in FIGS. 10A-10C, head portion 442 of the plunger 440 includes a pivotable localised central portion 442A with a frustoconical profile surrounding puncturing element 460 and having an outer periphery pivotably coupled to annular surrounding portion 442B.

As shown in FIG. 10B, advancement of a drive piston (not shown) engages the raised central spigot section 441B causing the localised central portion 442A to pivot and urge the puncturing element 460 against the frangible seal portion 450 whilst the annular surrounding portion 442B remains in its initial position. In this way, breaking of the frangible seal portion 450 to create an aperture 470 for dispensing flavouring syrup 430 from chamber 420 is achieved with minimal resistance to the drive piston (e.g. minimal air compression, no sliding friction between the plunger 440 and container 410).

As illustrated, the base 412 of container 410 has an inner face 412A with a sloped profile operative to direct flavouring syrup 430 towards the frangible seal portion 450 and the head portion 442 of plunger 440 has a trailing inner face 442A with a corresponding sloped profile once the localised central portion 442A has moved into the advanced position whereby in the third position the trailing inner face 442A of the head portion 442 substantially engages the inner face 442A of the base 412 of the container 410.

Puncturing element 460 comprises: a trailing aperture engaging shaft 462 extending from head portion 442 of plunger 440, through flavouring syrup 430 and towards the frangible seal portion 450; and a leading aperture forming spike 464.

As illustrated, trailing aperture engaging shaft 462 and leading aperture forming spike 464 have a cruciform cross-section.

Trailing aperture engaging shaft 462 has a first cross-sectional form of cross-sectional area $A_1$ and frangible seal portion 450 comprises a second cross-sectional form of cross-sectional area $A_2$ (wherein $A_1<A_2$) configured to combine with the first cross-sectional form of the trailing aperture engaging shaft 462 in order to create a predetermined flow gap configuration.

Figure 13:
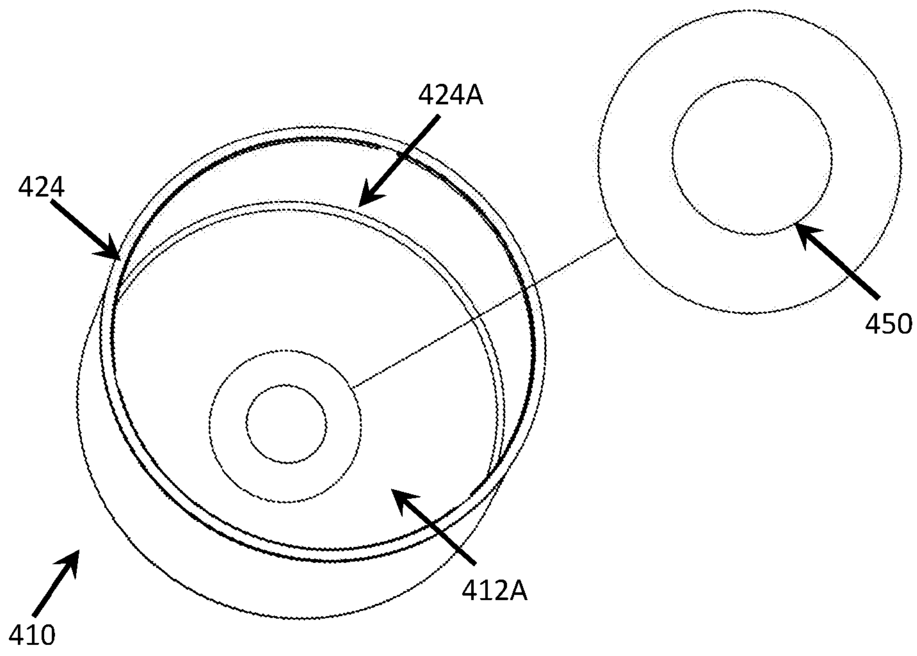
FIG. 13 is a schematic perspective view of the a container of flavouring capsule of FIG. 9 showing details of the frangible seal portion of the pierceable base portion.
Figure 14:
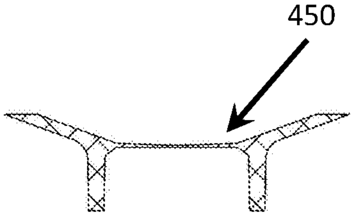
FIG. 14 is a schematic cross-sectional view of the frangible seal portion illustrated in FIG. 13.

In the illustrated example, the first cross-sectional form is an n-pointed star form (in this example, cruciform) and as illustrated in FIGS. 13 and 14 the second cross-sectional form is a planar constant diameter circular cross-sectional form. In this way, the first and second cross-sectional forms combine to create a predetermined configuration of n substantially equally circumferentially spaced flow gaps 472 around the trailing aperture engaging shaft 462 when it is fully engaged in the formed aperture 470, one flow gap at each point of the n-sided star form. This controls the flow of the fluid out of the chamber 420.

When ruptured by the leading aperture forming spike 464 (FIGS. 12D-12F), displaceable triangular flap portions 454 will fold outwards creating four triangular petals and four small flow gaps 472.

In use, during an initial puncturing step localised central portion 442A of plunger 440 is movable relative to the container 410 and the annular surrounding portion 442B (e.g. by drive piston 218 actuated by $CO_2$ pressure driving against the central spigot 441B provided on upper surface 441) from a first position (FIG. 10A) to a second position (FIG. 10B), wherein movement of the localised central portion 442A of plunger 440 relative to the container 410 from the first position to the second position causes puncturing element 460 to puncture the frangible seal portion 450 to form an aperture 470 for dispensing flavouring syrup 430 from chamber 420.

Once the frangible seal portion 450 is punctured, the entire plunger 440 (with the localised central portion 442A now in the advanced position) is further movable relative to the container 410 during a discharging step to a third position (FIG. 10C) with the drive piston bearing against the central spigot 441B and annular surrounding portion 442B, wherein movement of the plunger 440 relative to the container 410 from the second position to the third position urges the flavouring syrup 430 to flow out of the chamber 420 and through the aperture 470.

In the third position, puncturing element 460 extends substantially along a full length of the outlet nozzle 414 to create a central flavouring flow guide element.

Both parts 410 and 440 of flavour capsule 400 (and relevant parts of the aerator device 10) may designed to be made from a range of thermoplastic polymers as well as bio-materials, bio-degradable and compostable materials.

The flavouring syrup flow down the side of puncturing element 460 and returns to one stream of fluid as it leaves the tip.

In an alternative design, the spike may not return the individual jet to one stream such that multiple jets of fluid are generated.

Once the frangible seal portion 450 is ruptured, gas pressure continues to drive piston 218 forward to drive substantially all of the flavouring syrup 430 from the flavour capsule 400 and out of outlet nozzle 414.

Figure 15:
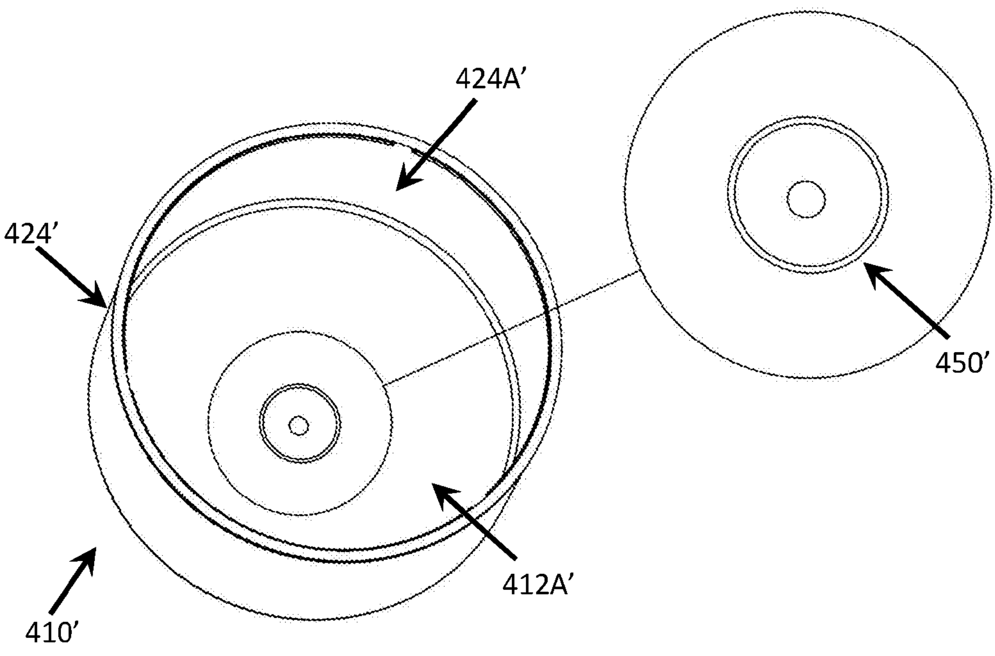
FIG. 15 is a schematic perspective view of an alternative container design for use with the flavouring capsule of FIG. 9 showing details of a first alternative frangible seal portion of the pierceable base portion.
Figure 16:
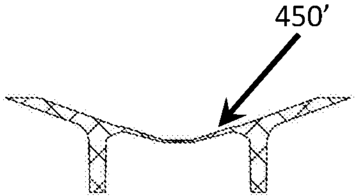
FIG. 16 is a schematic cross-sectional view of the alternative frangible seal portion illustrated in FIG. 15.

FIGS. 15 and 16 show an alternative container 410' for use in the flavour capsule 400 (features in common are labelled accordingly) and including an alternative frangible seal portion 450' in which the planar constant diameter circular cross-sectional form of frangible seal portion 450 is replaced by a frustoconical circular cross-sectional form 450'.

FIGS. 17 and 18A-D show a yet further alternative container 410" for use in the flavour capsule 400 (again features in common are labelled accordingly) and including a frangible seal portion 450" for use with a puncturing element with a circular cross-section form. As illustrated, frangible seal portion 450" defines a displaceable flap profile 452 comprising a plurality of n substantially equal length and equally circumferentially spaced lines of weakness 453 each formed by a rupturable thin wall section of plastics material and extending radially from the central axis "A" to an end region 453A. The n lines of weakness 453 divide the frangible seal portion 450 into a plurality of n circumferentially spaced radially extending displaceable triangular flap portions 454 each formed by a bendable thin wall section of plastics material and separated by the lines of weakness 453. In an alternative design, the displaceable flap profile may be an additional component or a two-shot moulding incorporating two different materials.

Each of the plurality of n displaceable triangular flaps 454 has reinforced edges 454A extending along the lines of weakness 453 to encourage the flaps to maintain their shape as the lines of weakness are broken by the puncturing action of the puncturing element and a reinforced hinge edge 454B formed by a reinforced region of material 455 adjacent each hinge edge.

When ruptured by the leading aperture forming spike 464 (FIGS. 18A-18D), displaceable triangular flap portions 454 will fold outwards creating triangular petals and six small flow gaps 472.

As in the previous embodiment, the flavouring syrup flows down the side of puncturing element and returns to one stream of fluid as it leaves the tip.

Again, in an alternative design, the spike may not return the individual jet to one stream such that multiple jets of fluid are generated.

FIGS. 19 and 20A-B illustrate an alternative plunger 440' for use in the flavour capsule 400 (features in common are labelled accordingly) and including a localised central portion 442A' with a flexible dome profile configured to operate in an equivalent manner to localised central portion 442A.

Figures 21, 22A, 22B:
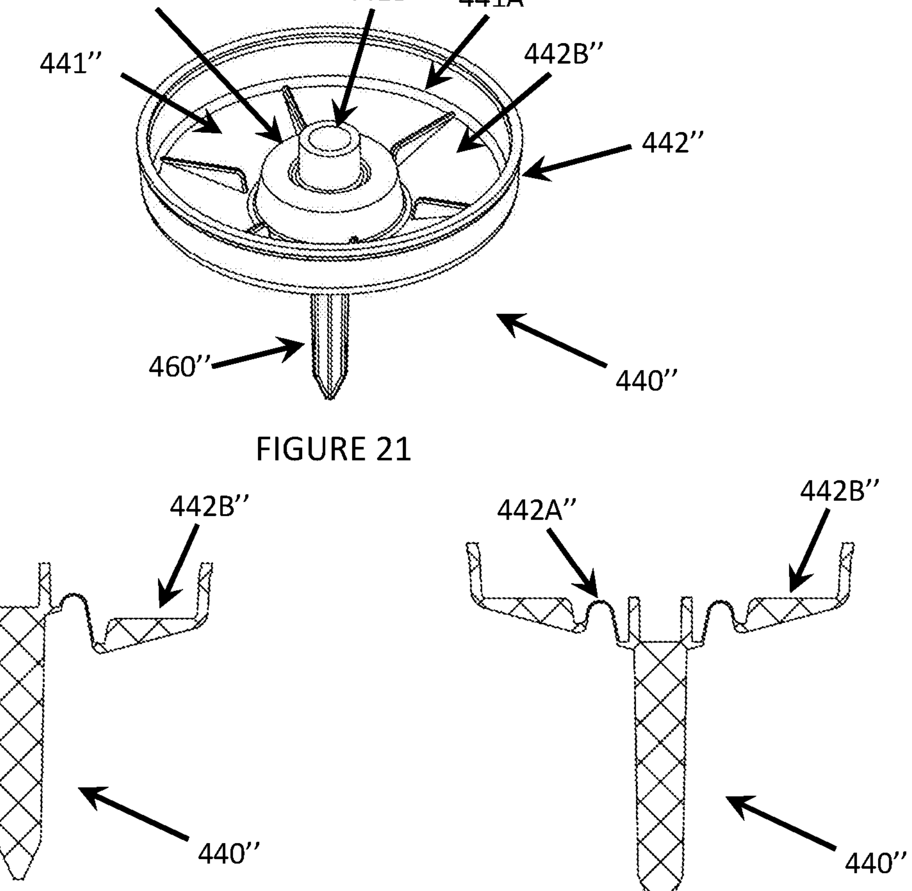
FIG. 21 is a schematic perspective view of a second alternative plunger design for use in the capsule of FIG. 9.
FIGS. 22A and 22B are schematic cross-sectional views of the second alternative plunger design of FIG. 21 illustrating its operation.

FIGS. 21 and 22A-B illustrate a yet further alternative plunger 440" for use in the flavour capsule 400 (features in common are labelled accordingly) and including a localised central portion 442A" with a flexible rolled convolute profile configured to operate in an equivalent manner to localised central portion 442A.

FIGS. 23A and 23B illustrate a further alternative embodiment of a flavour capsule 500 for use with a modified form of the aerator device 10 of FIG. 1, the flavour capsule 500 comprising: a sealed collapsible container 510 containing a flavouring syrup 520; a cap 530; and a tear-off collar 540 with a pull tab portion 542.

Cap 530 includes a flared upper portion 530A and a cylindrical lower portion 530B. Lower portion 530B defines a sleeve 532 for slidably receiving an end portion 512 of the collapsible container 510, a base portion 534 defining a central outlet 536 for dispensing the flavouring syrup 520 and at least one piercing element 538 extending from the base portion 534 adjacent the central outlet 536. Tear-off collar 540 is frangibly connected to an upper periphery 531 of the flared upper portion 530A and configured to enclose and abut a leading end 514B of a main body portion 514 of the collapsible container 510.

Main body portion 514 of collapsible container 510 has a folded bellows profile and defines a chamber 516 for receiving flavouring syrup 520, a piston contact surface 514A and a burstable membrane portion 518 sealing an opening to the chamber 516, the burstable membrane portion 518 being located at the end portion 512 of the collapsible container.

As illustrated, inner sleeve 532 and end portion 512 include cooperating retaining members 550A, 550B (e.g. projecting annular ribs) to enable advancement of the end portion 512 in the advancement direction but prevent withdrawal of the end portion 512 in the opposite direction, thereby retaining the collapsible container 510 in the cap 530.

As illustrated with reference to FIGS. 24A-24C, tear-off collar 540 must first be removed (e.g. by a user pulling on pull tab portion 542) to enable the end portion 512 of collapsible container 510 to be advanced towards the at least one piercing element 538. In this way, accidental actuation of the flavour capsule 500 during transit or a dropping may be prevented. The tear-off collar 540 may also act as a tamper-evident feature.

In one embodiment, main body portion 514 and cap 530 are formed from medium density polyethylene (MDPE).

In one embodiment, the burstable membrane portion 518 is a heat sealed membrane (e.g. heat sealed in a process on the filling line).

In one embodiment, flavour capsules 300, 300', 400, 500 may comprise a barcode and the electronic controller 80 is operative to select a dispensing parameter (e.g. degree of aeration and/or water volume required) based on the barcode (e.g. using a barcode reader module) to provide an even more enhanced dosage of flavouring.

Figure 25:
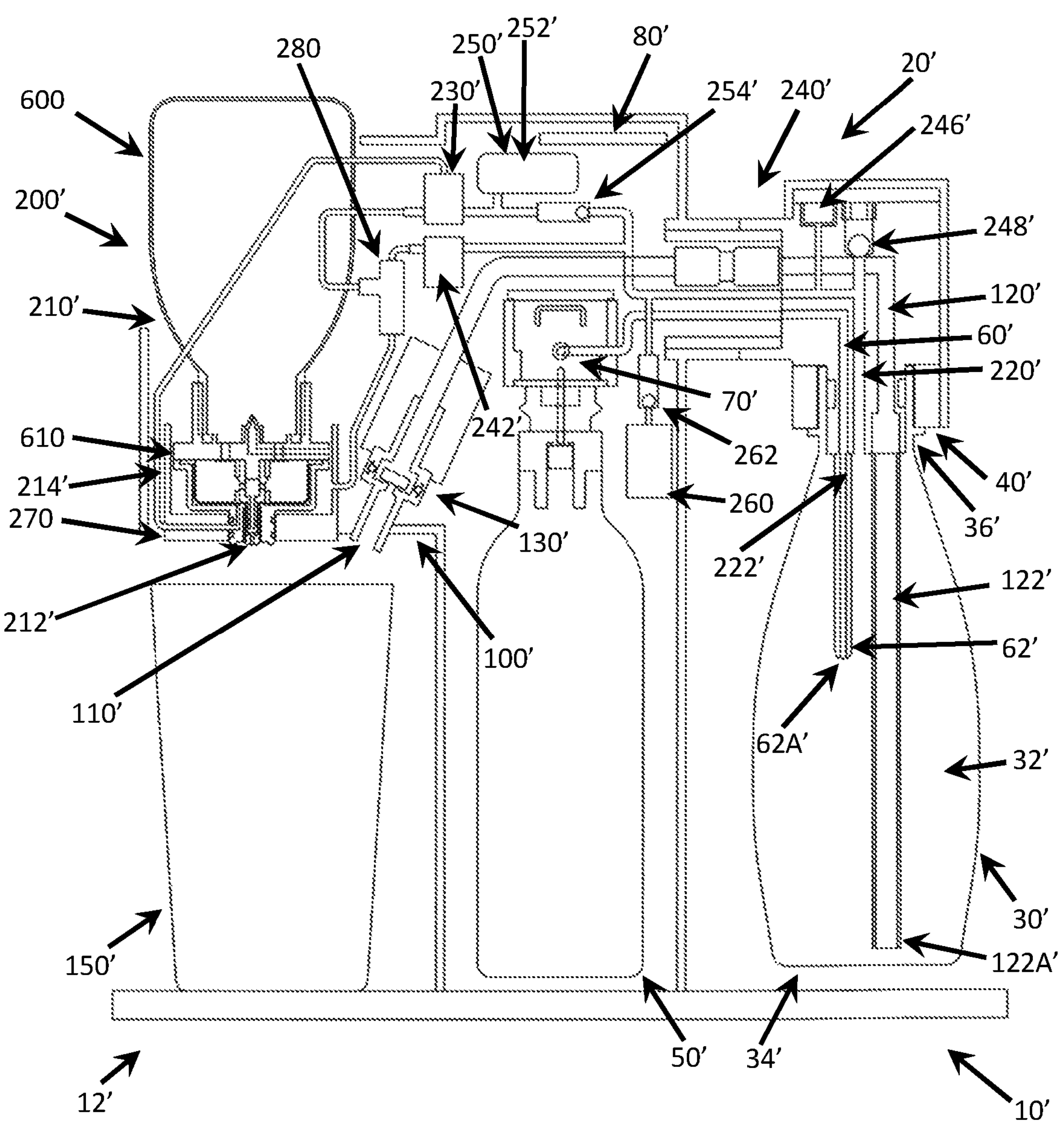
FIG. 25 is a schematic view of an aerator device in accordance with a further embodiment of the present invention.

In accordance with a further embodiment of the present invention, FIG. 25 shows an alternative portable domestic aerator device 10' for preparing aerated drinks based on aerator device 10 (features in common are labelled accordingly) in which the capsule 300 and associated capsule dispenser parts are replaced by a removable bulk container 600 with an integral bulk container dispenser module 610 incorporating flavouring liquid outlet 212'. In addition, an optional low pressure air pump 260 is connected to the gas outlet line 220' via a non-return valve 262 to provide a constant flow of low pressure gas to the headspace of chamber 32' during the dispense stage to transfer the aerated liquid from removable bottle 30' to the aerated liquid dispenser outlet 110'.

Bulk container 600 comprises a vented fixed volume (e.g. non-collapsing) bottle 602 with a neck portion 604. Bulk container 600 is configured to provide multiple measures of flavouring syrup over multiple uses of the aerator device 10'. Since the bulk container dispenser module 610 and flavouring liquid outlet 212' are integrated into the container, bulk containers of different flavours can be readily swapped over without risk of flavour contamination. In general, bulk container 600 may be a simple plug-in device. No retention features are necessary as the pressures at the bulk container interface are substantially balanced.

Figure 26A:
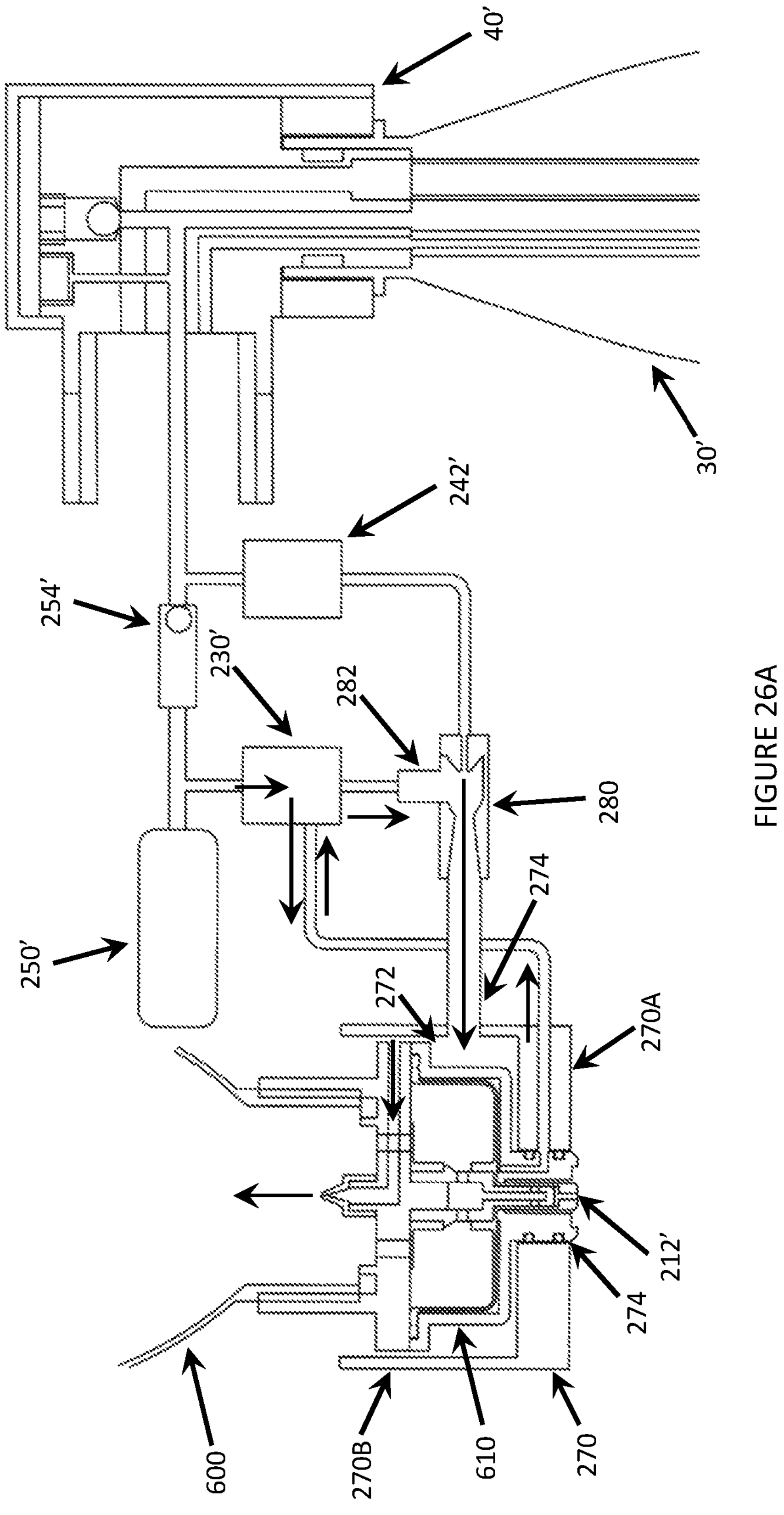
FIG. 26A is a schematic system view of the aerator device of FIG. 25 showing details of the flavour dispenser stage.
Figure 26B:
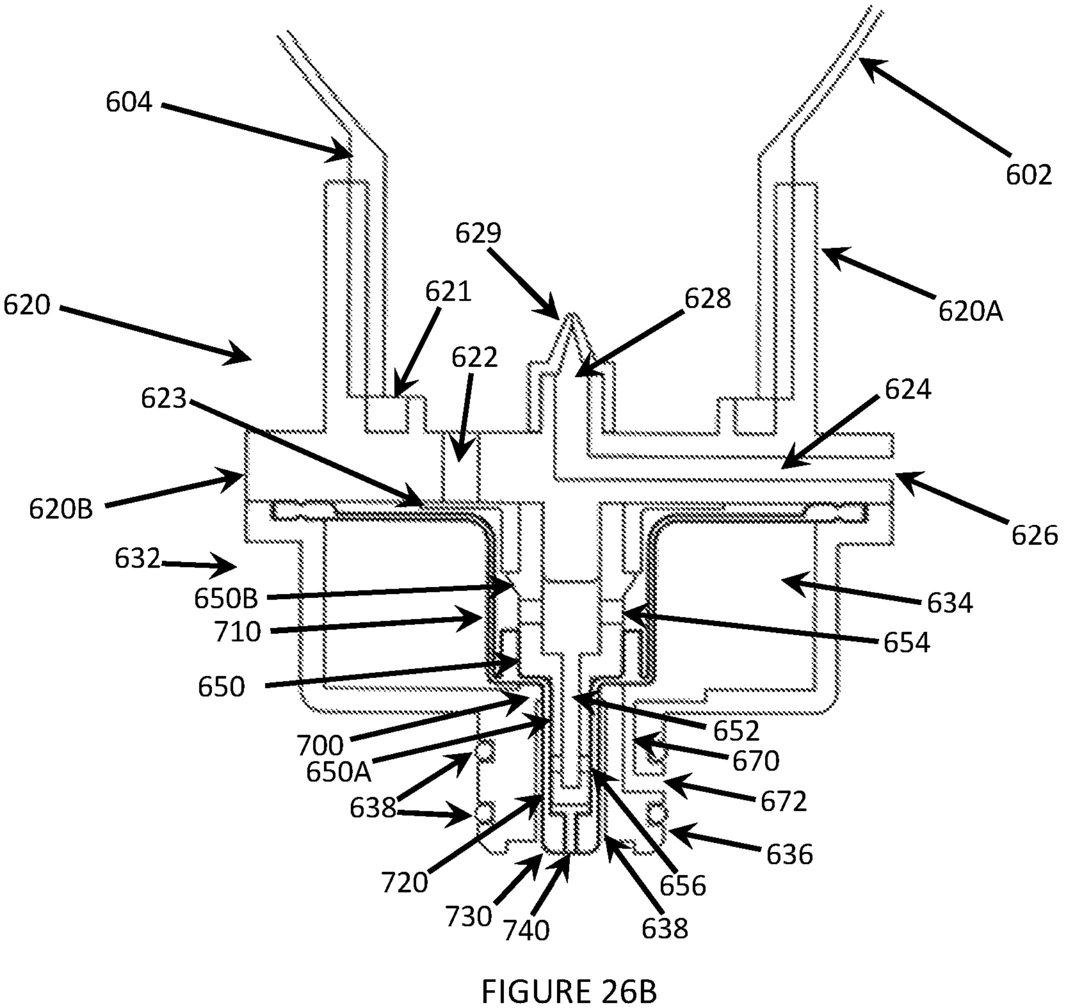
FIG. 26B is a schematic view of the bulk container dispenser module of the aerator device of FIG. 25.

As illustrated in FIGS. 26A and 26B, bulk container dispenser module 610 comprises an upper cap portion 620 and a lower housing 630 configured to engage a bulk container receptacle 270 supported by housing 12', the bulk container receptacle 270 comprising a base 270A and an upright annular wall 270B extending from the base.

Upper cap portion 620 comprises a collar 620A configured to receive neck portion 604 of bottle 602 and a base portion 620B. Base portion 620B defines a plurality of inlet apertures 622 associated with non-return inlet flap valves 623 for allowing flavouring syrup to flow out of bottle 602 under gravity and a gas line 624 extending from a radially outermost gas inlet 626 to a raised central gas outlet 628 associated with a gas outlet valve 629. Annular seal 621 seals the connection between the bottle 602 and upper cap portion 620.

Lower housing 630 comprises a cylindrical upper housing section 632 defining a metering chamber 634 configured to receive flavouring syrup from the bulk container 600 via inlet apertures 622 and a reduced diameter cylindrical nozzle housing 636 configured to engage an aperture 274 provided in base 270A of bulk container receptacle 270. Nozzle housing 636 further defines a gas line 670 extending between a gas inlet 672 and metering chamber 634.

A central shaft 650 comprising a narrow diameter leading end 650A and a wide diameter trailing end 650B is supported by upper cap portion 620 and extends centrally through metering chamber 634. Nozzle housing 636 defines a central bore 638 for receiving leading end 650A of central shaft 650. Central shaft 650 defines a central passageway 652 extending between inlet ports 654 and outlet ports 656.

Mounted to central shaft 650 is a flexible silicone diaphragm component 700 comprising an upper diaphragm part 710 received in metering chamber 634 and a lower diaphragm part 720 received in bore 638.

Upper diaphragm part 710 is coupled to a lower end of trailing end 650B of central shaft 650 and coupled to an upper periphery of metering chamber 634.

Lower diaphragm part 720 forms a pressure-actuated sleeve valve 722 covering outlet ports 656 and includes an end portion 730 defining an outlet nozzle 740 which functions as flavouring liquid outlet 212'.

As illustrated, the output nozzle 740 and sleeve valve 722 formed by lower diaphragm part 720 and the upper diaphragm part 710 are formed as a single contiguous piece of flexible silicone.

Figure 27A:
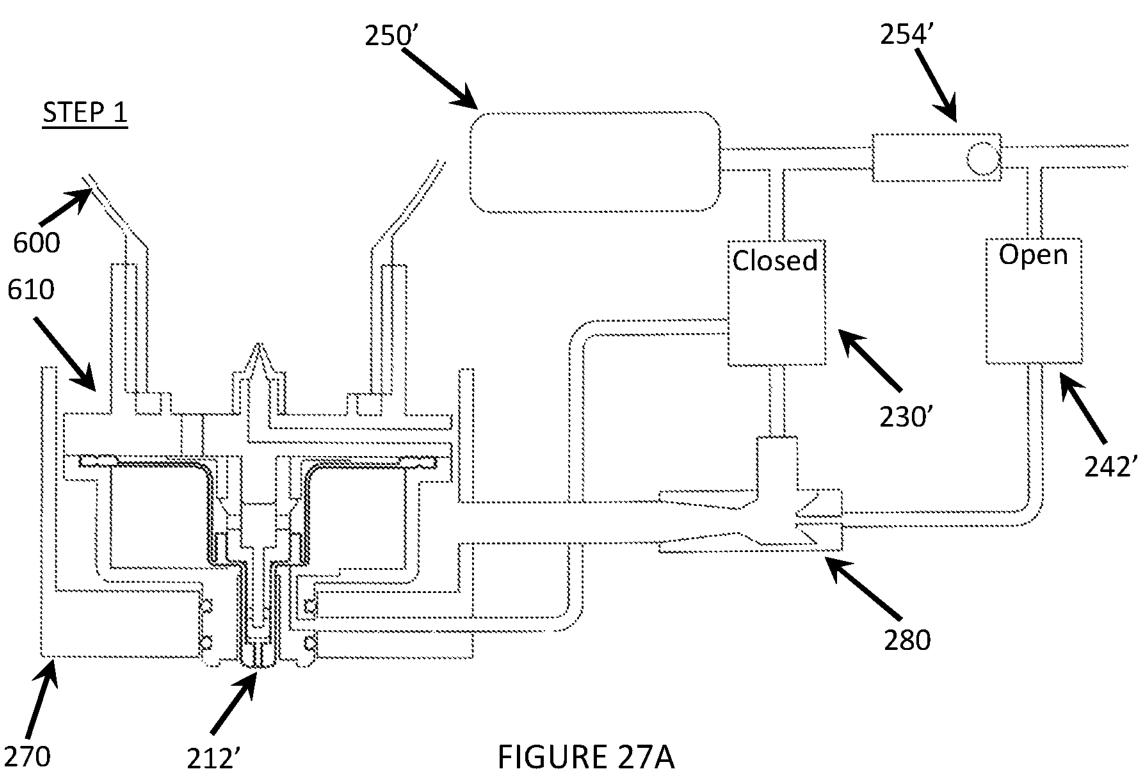
FIGS. 27A-27F are a schematic views illustrating operation of the flavour dispenser stage of the aerator device of FIG. 25 during operation of the aerator device.
Figure 27B:
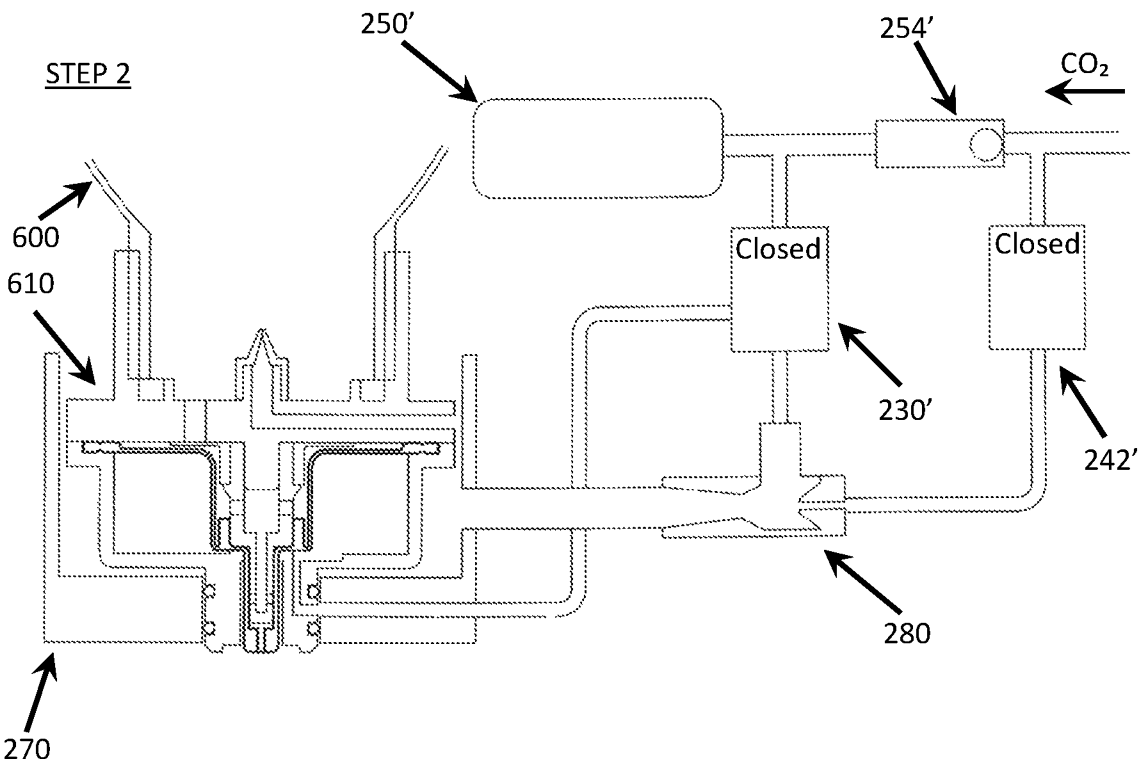
Figures 27C, 27D:
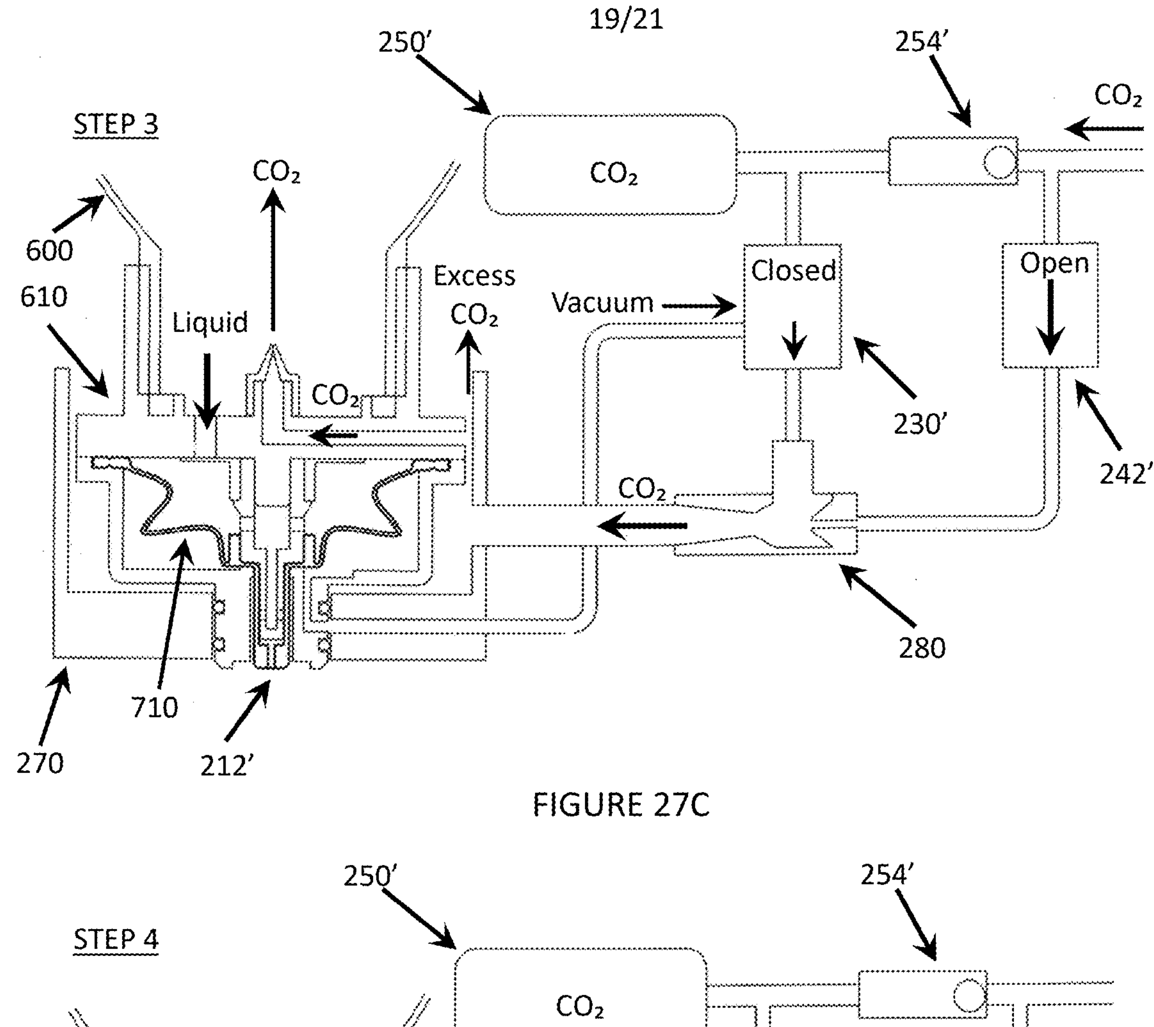
Figure 27E:
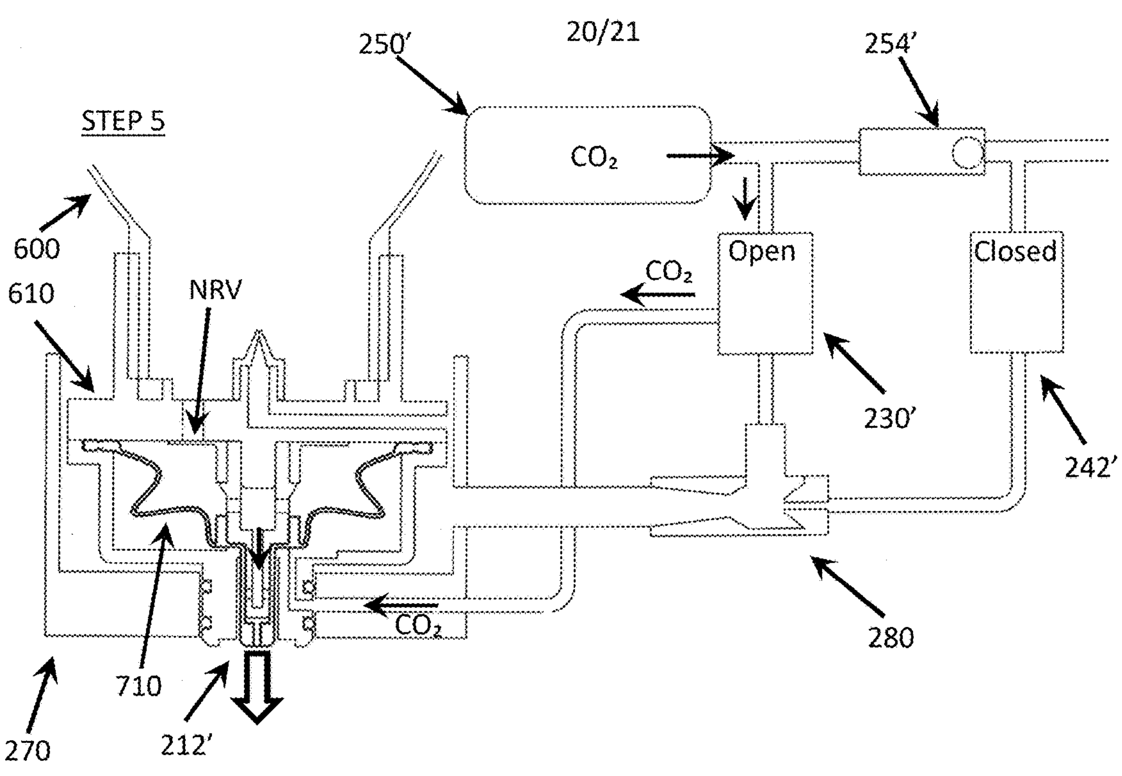
Figure 27F:
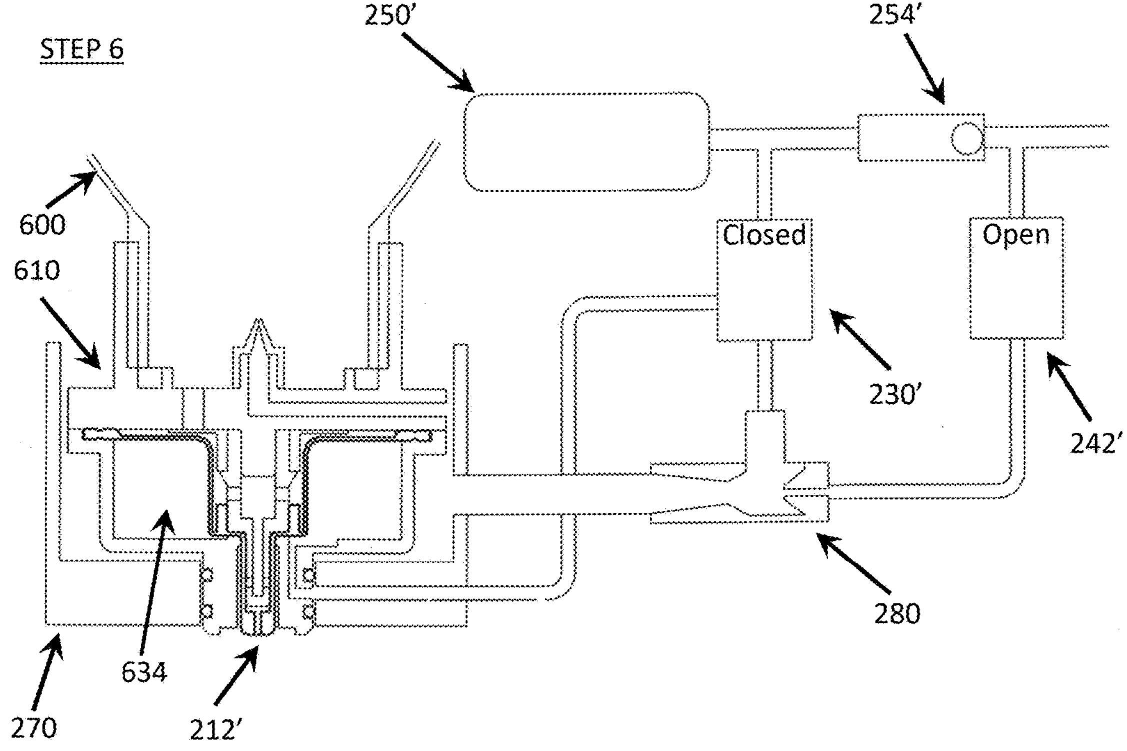

Upper diaphragm part 710 is movable within metering chamber 634 between a retracted position (shown in FIG. 27D) and an advanced position (shown in FIG. 27F) with movement from the retracted position to the advanced position forcing flavouring syrup received in metering chamber 634 to enter inlet ports 654 and flow through central passageway 652 to outlet ports 656 whereupon pressure-activated sleeve valve 722 allows the flavouring syrup to be dispensed out through outlet nozzle 740. Movement of upper diaphragm part 710 from the advanced position to the retracted position allows flavouring syrup to enter the metering chamber 634 from bottle 602.

Annular wall 270B of bulk container receptacle 270 defines an open-topped $CO_2$ collector region 272 (e.g. open bucket region) surrounding the bulk container dispenser module 610 and configured to receive $CO_2$ from removable bottle 30' during an exhaust cycle via a $CO_2$ feed pipe 274 connected to a venture nozzle 280. Venturi nozzle 280 is configured to receive gas flowing from removable aerator bottle 30' to the $CO_2$ collector region 272 during an exhaust cycle and comprises an upstream tap 282 connected to gas inlet 672. Exhaust gas entering $CO_2$ collector region 272 via $CO_2$ feed pipe 274 floods the environment around gas inlet 626 of dispenser module 610 which permits $CO_2$ to be pulled into bottle 602 via gas line 624/gas outlet 628 as metering chamber 634 fills with flavouring syrup. By virtue of the open top, excess $CO_2$ escapes $CO_2$ collector region 272 to atmosphere to avoid pressure build up in the bottle 602. Although $CO_2$ flooding is illustrated in this example, simple air-fill venting is also possible (e.g. where the flavouring syrup in bottle 602 is suitable for prolonged contact with air).

In operation, aerator device 10' provides the same functionality as aerator device 10 (e.g. the ability to dispense aerated liquid direct from the removable aerator bottle 30' or via aerated liquid dispenser outlet 80' with optional flavouring via flavouring liquid outlet 212'). However, as illustrated in FIGS. 27A-27F the gas cycles are modified to take account of the changes to the internal structure.

In Step 1 (FIG. 27A) the system is at rest with upper diaphragm part 710 in the advanced position. Exhaust solenoid valve 242' is open and the gas reservoir 250' connection via 3/2 gas outlet solenoid valve 230' is closed.

In Step 2 (FIG. 27B) exhaust solenoid valve 242' is closed whilst the system is carbonating. During this step pressurised $CO_2$ from the headspace of removable aerator bottle 30' is passed to gas reservoir 250' for later use in dispensing the flavouring syrup. The gas reservoir 250' connection via 3/2 gas outlet solenoid valve 230' remains closed to prevent release of pressurised $CO_2$ from gas reservoir 250'.

In Step 3 (FIG. 27C) the exhaust solenoid valve 242' is opened as the system performs an exhaust cycle to bring the pressure in the headspace of removable aerator bottle 30' down to a lower pressure (in this case down to approximately atmospheric pressure as dispensing of the aerated liquid will use gas pressure supplied by air pump 260). As the exhausted $CO_2$ passes through venturi nozzle 280, venturi nozzle 280 generates negative pressure at upstream tap 282 to suck upper diaphragm part 710 into the retracted position causing metering chamber 634 to fill with flavouring syrup. Again, the gas reservoir 250' connection via 3/2 gas outlet solenoid valve 230' remains closed to prevent release of pressurised $CO_2$ from gas reservoir 250'. In the case of multiple carbonation cycles, exhaust solenoid valve 242' may be actuated between carbonation cycles and at the end of carbonation.

In Step 4 (FIG. 27D) the exhaust cycle is completed and the metering chamber 634 is fully charged with a measure of flavouring syrup;

In Step 5 (FIG. 27E) the system is dispensing with air pump 260 applying low pressure air to the headspace of removable aerator bottle 30' to push the aerated liquid up through dip tube 122' to aerated liquid dispenser outlet 80'. In this dispensing mode exhaust solenoid valve 242' is closed and the gas reservoir 250' connection via 3/2 gas outlet solenoid valve 230' is opened to allow stored pressurised $CO_2$ from gas reservoir 250' to flow into metering chamber 634 via gas inlet 672. This positive gas pressure from gas reservoir 250' causes upper diaphragm part 710 to collapse and force flavouring syrup out through outlet nozzle 740 for combining with the aerated liquid flow via aerated liquid dispenser outlet 80'. This flavouring syrup dispensing action continues until the metering chamber 634 is emptied and upper diaphragm part 710 is returned to the retracted position.

In Step 6 (FIG. 27F) dispensing process is complete and the system is back to the rest state with exhaust solenoid valve 242' re-opened and the gas reservoir 250' connection via 3/2 gas outlet solenoid valve 230' closed.

In this way, a system is provided in which stored gas from gas reservoir 250' is used to collapse the upper diaphragm part 710 and dispense the flavouring syrup received in metering chamber 634, with $CO_2$ exhausted after the carbonation cycle being used to both refill the bottle 602 and—by means of venturi nozzle 280—create a reduced pressure in metering chamber 634 to suck upper diaphragm part 710 down and re-fill the metering chamber.

In one embodiment, removable bulk container 600 is configured to be installed in bulk container receptacle 270 in a predetermined orientation (e.g. to prevent accidental disconnection of bottle to dispenser when fitted to machine). In one example, the bottle 602 may have a substantially cylindrical profile with a single flat sided portion (e.g. anti-rotation portion). The bottle 602 may configured to be installed in bulk container receptacle in a single orientation relative to housing 12'. This also allows for orientation of bottle 602 for "smart" reading of product data (e.g. barcode read by electronic controller 80') to set carbonation level and water volume for the finished drink.

As an alternative to the fixed-volume bulk container 600 described above, a simplified version of bulk container dispenser module 610 may be used for a variable bulk container (e.g. bag or collapsible bottle) where the gas inlet into the bottle may be omitted.

Figure 28A:
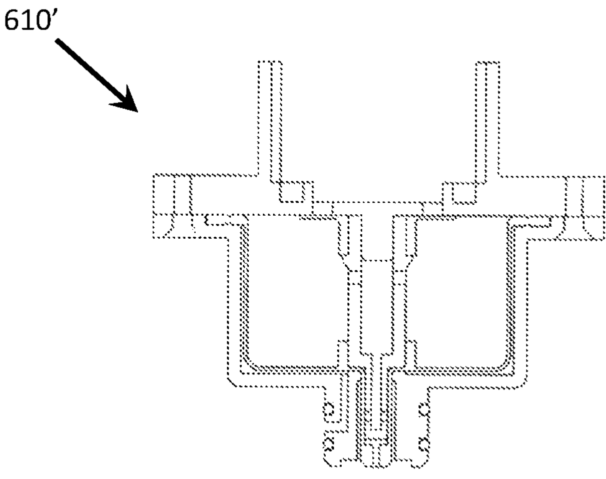
FIGS. 28A and 28B are schematic cross-sectional views of alternative bulk container dispenser modules for use with the aerator device of FIG. 25.

FIG. 28A shows an example of a first alternative bulk container dispenser module 610' comprising a simple central sealed plug for use with a variable volume container.

Figure 28B:
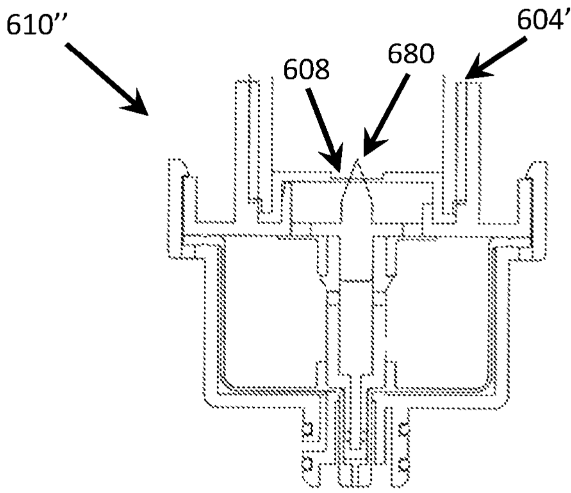

FIG. 28B shows an example of a second alternative bulk container dispenser module 610" including a membrane piercing element 680 for use with a variable volume container including a membrane 608 for sterile fill products.

As will be appreciated, portable domestic aerator devices 10, 10' provide significant enhancements and flexibility over a conventional domestic carbonator device whilst being substantially powered by gas pressure available in the headspace of a conventional domestic carbonator device. In this way, the enhancement and increased flexibility are provided with minimal additional complexity and cost the aerator device.

The invention claimed is:

1. Apparatus for the preparation of aerated drinks, comprising:

an aerator stage comprising:
- a removable aerator bottle defining a chamber for receiving a liquid to be aerated;
- an aerator bottle interface operative to engage the removable aerator bottle and seal the chamber of the removable aerator bottle;
- a gas inlet line operative to fluidly connect a gas source to the aerator bottle interface; and
- a gas supply mechanism for controlling supply of gas from the gas source to the aerator bottle interface via the gas inlet line;

an aerated liquid dispenser stage comprising:
- an aerated liquid dispenser outlet;
- a liquid outlet line operative to fluidly connect the aerator bottle interface to the aerated liquid dispenser outlet to allow aerated liquid to flow from the chamber of the removable aerator bottle to the aerated liquid dispenser outlet; and a liquid flow controller for controlling discharge of aerated liquid from the removable aerator bottle to the aerated liquid dispenser outlet via the liquid outlet line; and a flavoring liquid dispenser stage comprising:

a flavoring liquid dispenser comprising a flavoring liquid dispenser outlet, wherein the flavoring liquid dispenser comprises a flavoring liquid dispenser mechanism that is activated by gas pressure; and a gas outlet line including a gas outlet provided in the aerator bottle interface;

wherein the apparatus further comprises a pressure control stage comprising:

a gas reservoir connected to the gas outlet line and operative to store pressurized gas received from the removable aerator bottle during an initial aeration step; and an exhaust mechanism operative to vent gas from the removable aerator bottle during a subsequent venting step in order to lower the level of gas pressure in the removable aerator bottle prior to discharge of the aerated liquid from the removable aerator bottle via the aerated liquid dispenser stage;

wherein:

the flavoring liquid dispenser is configured to dispense flavoring liquid from a bulk container; and the flavoring liquid dispenser mechanism comprises a bulk container dispenser module associated with the bulk container, the bulk container dispenser module comprising:

a metering chamber configured to receive flavoring liquid from the bulk container;

a directional valve operative to allow flavoring liquid to flow from the bulk container to the metering chamber and the bulk container dispenser module comprises a diaphragm movable between a first configuration and a second configuration with dispensing of flavoring liquid occurring as the diaphragm moves from the first configuration to the second configuration, wherein movement from the first configuration to the second configuration occurs in response to a positive pressure from the gas reservoir and movement from the second configuration to the first configuration occurs in response to a negative pressure.

2. Apparatus according to claim 1, wherein the apparatus further comprises a suction device operative to move the diaphragm from the second configuration to the first configuration.

3. Apparatus according to claim 2, wherein;

the apparatus further comprises a gas collector configured to receive gas from the chamber of the removable aerator bottle or from the gas reservoir; and the suction device comprises a venturi nozzle operative to generate a negative pressure in the metering chamber for receiving the flavoring liquid from the bulk container as the gas collector is filled.

* * * * *